United States Patent
Ozawa

(10) Patent No.: US 9,334,389 B2
(45) Date of Patent: May 10, 2016

(54) INKJET RECORDING INK AND METHOD FOR PRODUCING THE SAME

(71) Applicant: KYOCERA Document Solutions Inc., Osaka (JP)

(72) Inventor: Noriaki Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/470,047

(22) Filed: Aug. 27, 2014

(65) Prior Publication Data

US 2015/0065631 A1    Mar. 5, 2015

(30) Foreign Application Priority Data

Aug. 29, 2013    (JP) .................................. 2013-177898

(51) Int. Cl.
| | |
|---|---|
| *C09D 11/10* | (2014.01) |
| *C08K 5/06* | (2006.01) |
| *C09D 133/06* | (2006.01) |
| *C09D 11/107* | (2014.01) |
| *C09D 11/322* | (2014.01) |
| *C09D 11/38* | (2014.01) |

(52) U.S. Cl.
CPC ................ *C08K 5/06* (2013.01); *C09D 11/107* (2013.01); *C09D 11/322* (2013.01); *C09D 11/38* (2013.01); *C09D 133/06* (2013.01); C08L 2201/54 (2013.01)

(58) Field of Classification Search
None
See application file for complete search history.

(56) References Cited

U.S. PATENT DOCUMENTS

| | | | |
|---|---|---|---|
| 7,235,126 B2 | 6/2007 | Tami et al. | |
| 2004/0259978 A1 | 12/2004 | Tami et al. | |
| 2007/0263058 A1* | 11/2007 | Sao ..................... | C09B 67/0083 347/100 |
| 2010/0075041 A1* | 3/2010 | Wachi ................... | C09D 11/40 427/256 |
| 2013/0155143 A1* | 6/2013 | Ozawa ................. | C09D 7/1233 347/20 |

FOREIGN PATENT DOCUMENTS

| | | |
|---|---|---|
| JP | H11-124524 A | 5/1999 |
| JP | 2005-008725 A | 1/2005 |

OTHER PUBLICATIONS

An Office Action; "Notice of Reasons for Rejection," issued by the Japanese Patent Office on Nov. 17, 2015, which corresponds to Japanese Patent Application No. 2013-177898 and is related to U.S. Appl. No. 14/470,047.

* cited by examiner

*Primary Examiner* — Vu A Nguyen

(74) *Attorney, Agent, or Firm* — Studebaker & Brackett PC

(57) ABSTRACT

An inkjet recording ink contains a polyhydric alcohol monoethyl ether or a polyhydric alcohol monopropyl ether, and a polyhydric alcohol monobutyl ether. Further, a method for producing an inkjet recording ink includes forming a pigment dispersion by kneading a pigment, an anionic resin and water, mixing the pigment dispersion with a water-soluble nonionic acrylic resin or a prepolymer thereof, triethylene glycol monobutyl ether, diethylene glycol monoethyl ether or diethylene glycol monopropyl ether, and water, and filtering a mixture resulting from the mixing.

8 Claims, 4 Drawing Sheets

INKJET RECORDING INK AND METHOD FOR PRODUCING THE SAME

INCORPORATION BY REFERENCE

The present application claims priority under 35 U.S.C. §119 to Japanese Patent Application No. 2013-177898, filed Aug. 29, 2013. The contents of this application are incorporated herein by reference in their entirety.

BACKGROUND

The present disclosure relates to an inkjet recording ink and a method for producing the same.

In recent years, owing to rapid development of inkjet recording technology, a high definition inkjet picture equal to a silver halide picture can be obtained. Besides, in accordance with the increase of a printing speed, a line head (a long head) is used in some cases.

In order to form a high-quality image, characteristics of an ink to be used are significant. For example, an ink containing a nonionic polymer has been proposed. Owing to the nonionic polymer, aggregation of a pigment on a recording material is accelerated as well as dispersion stability of the pigment in the ink is improved.

SUMMARY

An inkjet recording ink according to the present disclosure contains a polyhydric alcohol monoethyl ether or a polyhydric alcohol monopropyl ether, and a polyhydric alcohol monobutyl ether.

A method for producing an inkjet recording ink according to the present disclosure includes: forming a pigment dispersion by kneading a pigment, an anionic resin and water; mixing the pigment dispersion with a water-soluble nonionic acrylic resin or a prepolymer thereof, triethylene glycol monobutyl ether, diethylene glycol monoethyl ether or diethylene glycol monopropyl ether, and water; and filtering a mixture resulting from the mixing.

DETAILED DESCRIPTION

An embodiment of the present disclosure will now be described with reference to the accompanying drawings.

Figure 1:
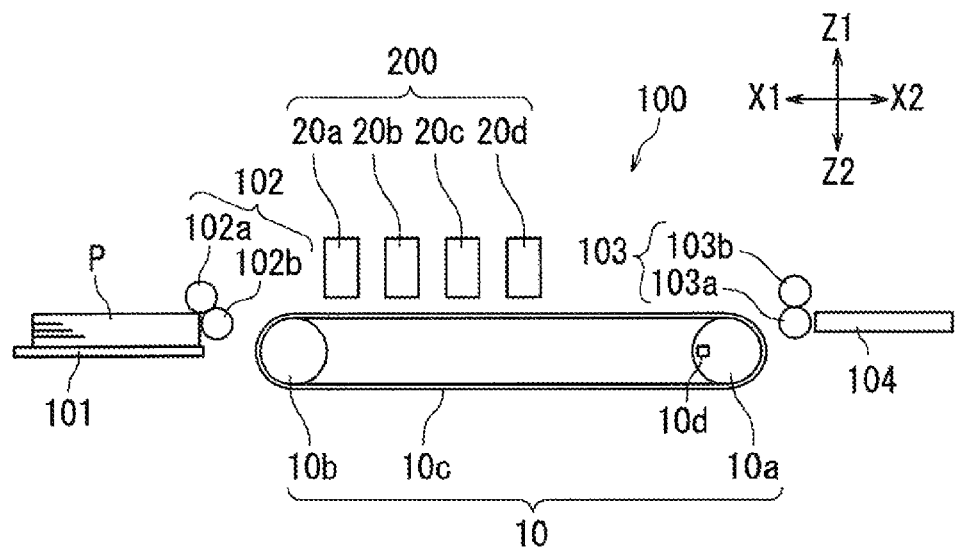
FIG. 1 is a diagram illustrating the outline of an inkjet recording apparatus (particularly, a structure thereof pertaining to ink ejection) according to an embodiment of the present disclosure.

An inkjet recording ink according to the present embodiment is used in, for example, an inkjet recording apparatus (a printer 100) illustrated in FIG. 1. Mainly referring to FIG. 1, the structure and the operation of the printer 100 will now be described.

As illustrated in FIG. 1, the printer 100 forms an image by ejecting an ink onto a recording sheet on the basis of image data and printing conditions (for example, whether or not duplex printing is to be performed) received from, for example, an external computer. The printer 100 is, for example, a color printer.

The printer 100 includes a paper feed cassette 101. Paper P is set in the paper feed cassette 101. The paper P is, for example, plain paper. In the present embodiment, the paper P corresponds to a recording sheet.

The paper feed cassette 101 is provided with a paper feed device 102. The paper feed device 102 includes a roller 102a driven by a motor or the like, and a roller 102b pressed against and driven by the roller 102a. The paper feed device 102 feeds the paper P set in the paper feed cassette 101 one by one to a conveyance unit 10.

The conveyance unit 10 includes rollers 10a and 10b, and an endless conveyance belt 10c. The conveyance belt 10c is wound around the rollers 10a and 10b spaced from each other to be tightly stretched. The conveyance belt 10c is rotated in accordance with the rotation of the rollers 10a and 10b positioned at the ends. In the present embodiment, among the rollers 10a and 10b, merely the roller 10a provided on the downstream side (on an X2 side) along a conveyance direction is driven. In the present embodiment, the conveyance belt 10c electrostatically adsorbs the paper P by generating an alternating electric field by, for example, applying a voltage to the roller 10a or 10b. For releasing the electrostatic adsorption, for example, the roller 10a or 10b is grounded.

The roller 10a is provided with an encoder 10d. The encoder 10d outputs a pulse train in accordance with the rotational displacement of the rotation axis of the roller 10a. It is noted that the conveyance belt 10c may be provided with a tension roller if necessary. Alternatively, the paper P may be adsorbed onto the conveyance belt 10c by suction instead of the electrostatic adsorption.

The roller 10a is driven by, for example, a motor. When the roller 10a is rotated, the torque is transmitted via the conveyance belt 10c to the roller 10b, and the roller 10b is driven to be rotated. In accordance with the rotation of the rollers 10a and 10b, the conveyance belt 10c is rotated. Thus, the paper P adsorbed onto the conveyance belt 10c is conveyed from the upstream side (an X1 side) to the downstream side (the X2 side) along the conveyance direction.

An image forming section 200 is provided above (on a Z1 side of) the conveyance unit 10. While the paper P is being conveyed by the conveyance unit 10, an ink is ejected onto the paper P from the image forming section 200, so as to form (record) an image with the ink on one surface (a recording surface) of the paper P.

An exit device 103 is provided in the vicinity of a downstream end (an end on the X2 side) of the conveyance unit 10. Besides, an exit tray 104 is provided on the downstream side of the exit device 103. The exit device 103 includes a roller 103a driven by a motor or the like, and a roller 103b pressed against and driven by the roller 103a. After the image formation, the paper P is conveyed by the conveyance unit 10 to the exit device 103, and is discharged to the exit tray 104 by the exit device 103. The discharged paper P is loaded on the exit tray 104.

In the present embodiment, after ejecting the ink, the printing surface (the recording surface) of the paper P (the recording sheet) comes into contact with the roller 103b (a conveyance roller). Besides, in the present embodiment, the printing surface of the paper P comes into contact with the roller 103b before the ink permeates or dries. When such a structure is employed, since the paper P is conveyed before the ink completely permeates or dries, the printing speed (the throughput) can be improved. On the other hand, however, a portion of the ink having adhered to the conveyance roller is liable to adhere again (offset) to the surface of paper fed next.

The image forming section 200 includes line heads 20a, 20b, 20c, and 20d for respectively ejecting inks of four colors different from one another. Hereinafter, if there is no need to distinguish the line heads 20a, 20b, 20c, and 20d (namely, if common characteristics and the like are to be described), each of the line heads 20a, 20b, 20c, and 20d is designated as the line head 20.

Figure 2:
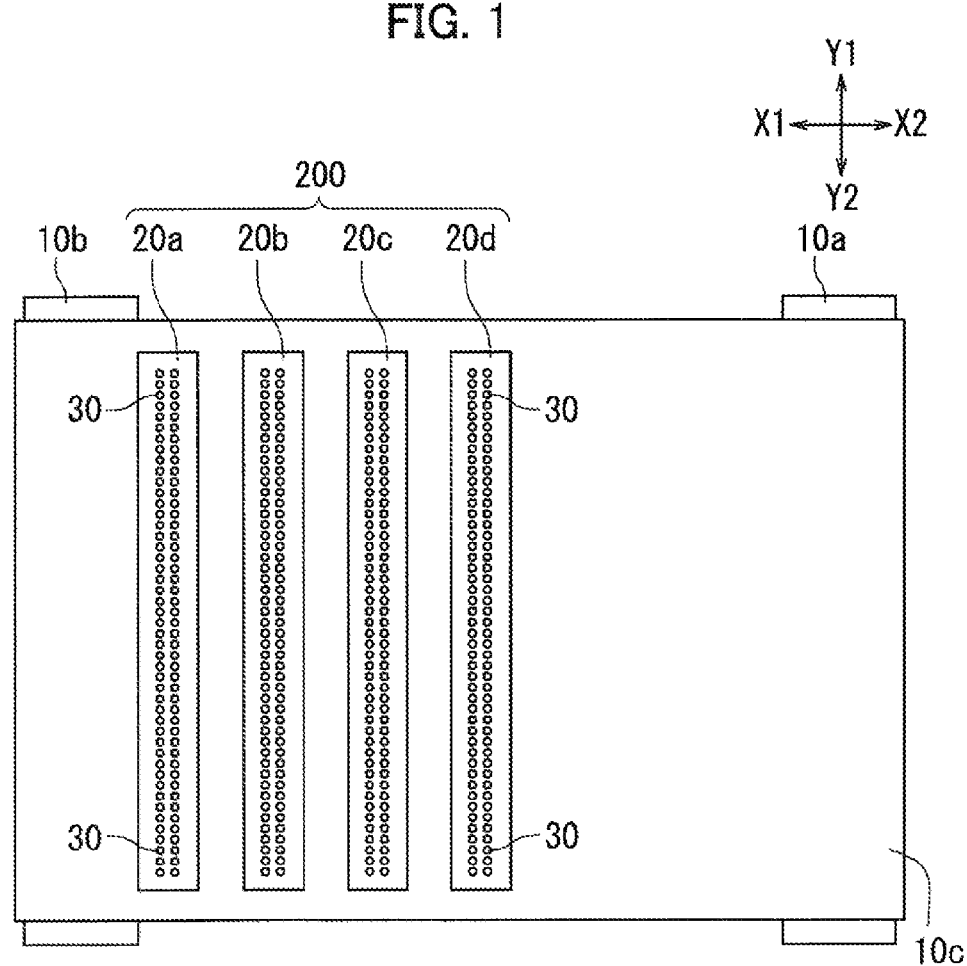
FIG. 2 is a diagram illustrating each line head included in an image forming section of FIG. 1

Next, mainly referring to FIG. 2, the structure of the image forming section 200 will be described. FIG. 2 is a schematic diagram illustrating each line head 20 included in the image forming section 200.

The line head 20 is a line type inkjet head. The line head 20 corresponds to a long inkjet head. The line head 20 is provided to extend along a direction (corresponding to the Y direction) perpendicular to the conveyance direction (corresponding to the X direction) for the paper P. The length of the line head 20 is preferably larger than the width of the paper P. Thus, every line of an image can be formed at a time.

In the present embodiment, each line head 20 includes a plurality of ejecting units 30. The ejecting units 30 are arranged along the Y direction. The ejecting units 30 are formed in each line head 20 (namely, in one head) in number of, for example, 166, and formed in total number of 664 as a whole (in the whole four heads). A pitch between the ejecting units 30 in each line head 20 is set to, for example, 150 dpi. Besides, the line heads 20 adjacent to each other are provided to be shifted by ¼ pitch, so that the dot density of the whole (of the four heads) can be 600 dpi.

Each line head 20 ejects an ink through the respective ejecting units 30 in accordance with an image signal. As a method for ejecting the ink, for example, a piezo method in which an ink is pushed out by a piezo element is employed. The method is, however, not limited to this, but the method for ejecting the ink in the image forming section 200 is arbitrarily set and may be, for example, a thermal inkjet method in which a pressure is applied to an ink by generating bubbles therein by using a heating element.

In the present embodiment, the line heads 20a, 20b, 20c, and 20d are respectively filled with inks of different colors (of, for example, Y (yellow), M (magenta), C (cyan), and Bk (black)).

In the printer 100 of the present embodiment, an image is formed (recorded) on the paper P (the recording sheet) by ejecting the inks successively from the respective line heads 20. More specifically, in the present embodiment, the line heads 20 are arranged from the upstream side (the X1 side) to the downstream side (the X2 side) of the conveyance direction for the paper P in the order of the line heads 20a, 20b, 20c, and 20d, and the inks are ejected in the same order. In the printer 100 having such a structure, the inks of the four colors (yellow ink, magenta ink, cyan ink, and black ink) can be ejected onto the same position on the paper P. Besides, a full color image can be formed (recorded) on the paper P by ejecting the inks of the four colors. Furthermore, the printer 100 can also form (record) a black-and-white image.

Figure 3A:
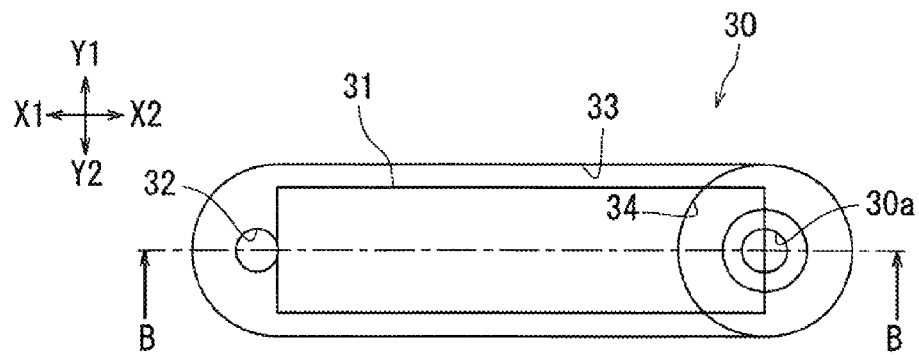
FIG. 3A is a diagram illustrating an ejecting unit of the line head of FIG. 2.

Subsequently, mainly referring to FIGS. 3A and 3B, the structure of each ejecting unit 30 will be described. FIG. 3A is a schematic diagram illustrating the ejecting unit 30, and FIG. 3B is a cross-sectional view taken on line B-B of FIG. 3A.

Figure 3B:
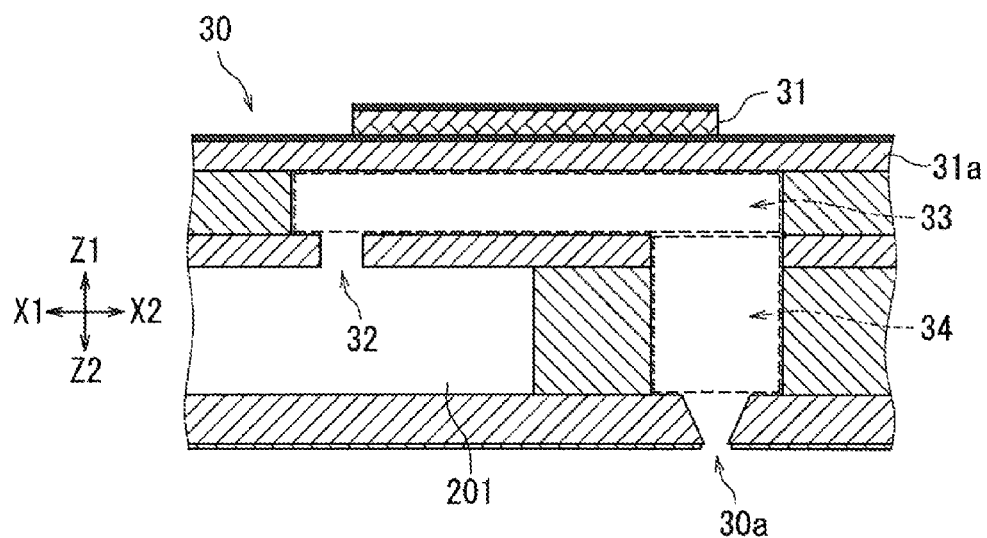
FIG. 3B is a cross-sectional view taken on line B-B of FIG. 3A.

As illustrated in FIGS. 3A and 3B, the ejecting unit 30 includes a nozzle 30a, an actuator 31, a diaphragm 31a, a hole 32, a pressure chamber 33, and a nozzle channel 34. The hole 32, the pressure chamber 33, the nozzle channel 34, and the nozzle 30a are communicated with one another. Besides, the pressure chambers 33 of the respective ejecting units 30 are connected to a common channel 201 via the holes 32. The ink is supplied to the common channel 201 from an ink tank not shown by using a pump or the like.

The actuator 31 includes, for example, a piezoelectric element. When a voltage is applied to the piezoelectric element (the actuator 31), the piezoelectric element is deformed by the inverse piezoelectric effect. The deformation of the piezoelectric element is transmitted via the diaphragm 31a to the pressure chamber 33. Thus, the pressure chamber 33 is compressed. A pressure is applied by the actuator 31, in the pressure chamber 33, to the ink fed from the common channel 201 to the pressure chamber 33 via the hole 32, so that the ink can be ejected through the nozzle channel 34 from the nozzle 30a.

The pressure chamber 33 has, for example, an area (in the XY plane) of 0.2 mm$^2$, and a size of a width (in the Y direction) of 200 μm, and a depth (in the Z direction) of 100 μm. The nozzle channel 34 has a size of, for example, a diameter of 200 μm, and a length (in the Z direction) of 800 μm. The hole 32 (a narrow portion) has a size of, for example, a diameter of 30 μm, and a length (in the Z direction) of 40 μm. The nozzle 30a has a length (in the Z direction) of, for example, 30 μm. An ejection port (in the XY plane) of the nozzle 30a is, for example, in a circular shape having a radius of 10 μm.

Figure 4:
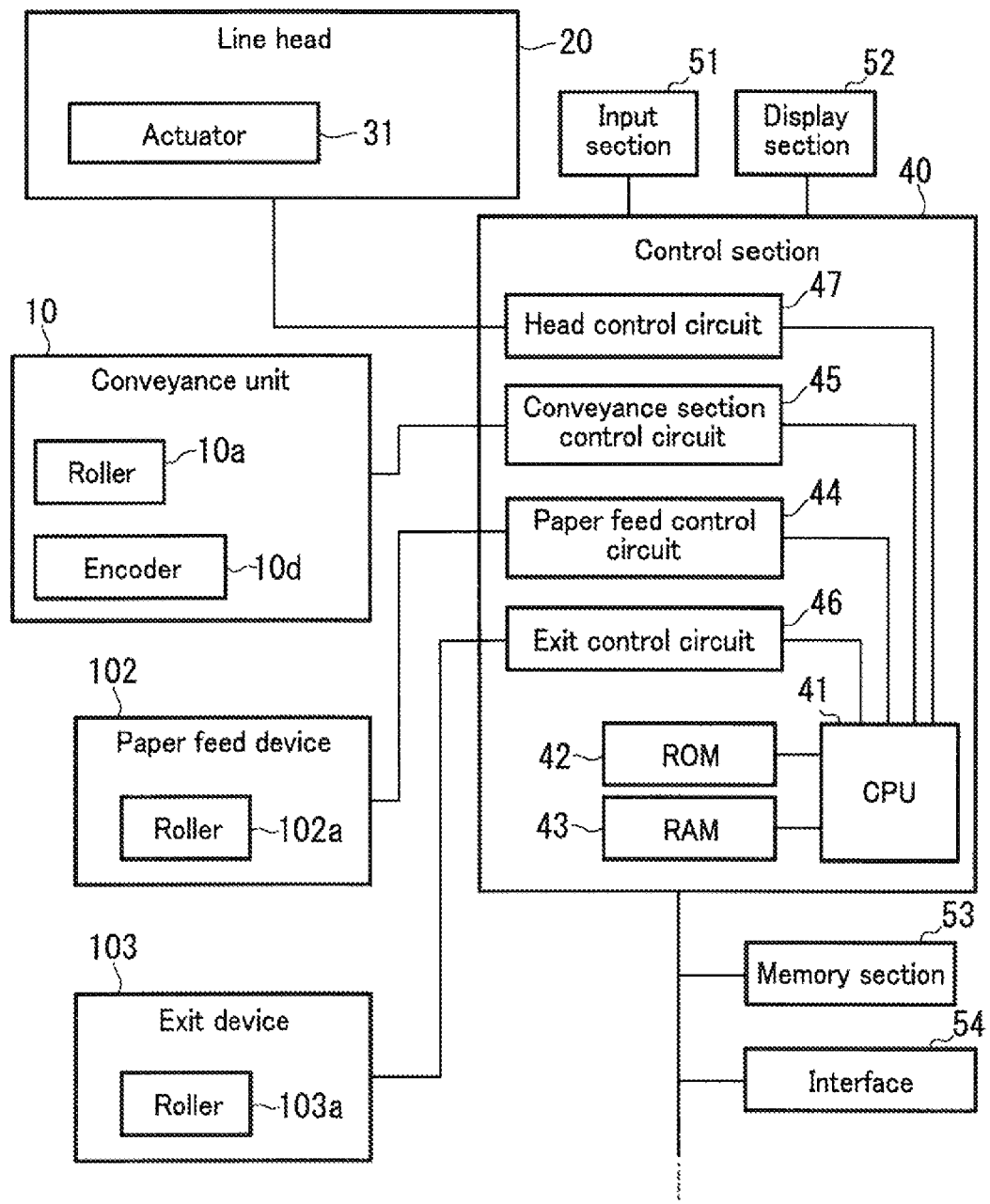
FIG. 4 is a block diagram illustrating the outline of a structure pertaining to electronic control of the inkjet recording apparatus according to the embodiment of the present disclosure.

Next, mainly referring to FIG. 4, a structure pertaining to electronic control of the printer 100 will be described. FIG. 4 is a block diagram illustrating the outline of the structure pertaining to the electronic control of the printer 100.

As illustrated in FIG. 4, a control section 40 includes a CPU (Central Processing Unit) 41, a ROM (Read Only Memory) 42, a RAM (Random Access Memory) 43, a paper feed control circuit 44, a conveyance section control circuit 45, an exit control circuit 46, and a head control circuit 47.

The ROM 42 is a PROM (Programmable ROM) such as a flash memory. The ROM 42 stores, for example, programs such as a BIOS (Basic Input/Output System), an OS (Operating System), various drivers, and various applications. The RAM 43 is, for example, a DRAM (Dynamic RAM).

The CPU 41 controls the paper feed device 102 (such as the motor for driving the roller 102a) through the paper feed control circuit 44. Besides, the CPU 41 controls the exit device 103 (such as the motor for driving the roller 103a) through the exit control circuit 46.

The CPU 41 receives an output signal of the encoder 10d and the like from the conveyance unit 10. Besides, the CPU 41 controls the conveyance unit 10 (such as the motor for driving the roller 10a) through the conveyance section control circuit 45. In addition, the conveyance section control circuit 45 applies a voltage for the electrostatic adsorption to the roller 10a or 10b. The CPU 41 can detect the rotation of the roller 10a, which substantially corresponds to the feed rate of the paper (the position of the paper), by, for example, counting the number of pulses included in the output signal of the encoder 10d.

The CPU 41 controls the line heads 20 (such as the actuators 31) through the head control circuit 47.

The control section 40 is connected to an input section 51, a display section 52, a memory section 53, and an interface 54 to be communicable with each other.

The input section 51 includes a keyboard, a mouse, a touch panel or the like. The display section 52 includes a display such as an LCD (Liquid Crystal Display) or an ELD (Electro Luminescence Display). Incidentally, if the input section 51 and the display section 52 are constructed from a touch panel, the input section 51 and the display section 52 are integrated with each other.

The memory section 53 includes a nonvolatile memory such as a hard disk. The memory section 53 stores image data for printing, programs used for various controls, data used in the programs, and the like.

The interface 54 enables data transmission/receipt between the control section 40 and an external apparatus. The control section 40 is connected via the interface 54 to a general computer (what is called a personal computer) or the like. The control section 40 controls the paper feed device 102, the conveyance unit 10, the line heads 20, the exit device 103, and the like on the basis of, for example, image data, printing conditions and the like received through the interface 54.

Next, an ink (more specifically, an inkjet recording ink) according to the present embodiment will be described.

The ink of the present embodiment is a water based ink. A water content in the ink is preferably 20% by mass or more and 70% by mass or less, and more preferably 25% by mass or more and 60% by mass or less based on the total mass of the ink.

The ink of the present embodiment contains water, a colorant (a pigment dispersion), a dispersant, and a penetrant. Now, the pigment, the dispersant (a surfactant), and the penetrant contained in the ink of the present embodiment will be successively described. Incidentally, in order to stabilize the solution state of the ink components, a solution stabilizer may be added to the ink. Besides, in order to stabilize the viscosity of the ink, a humectant for inhibiting vaporization of a liquid component of the ink may be added to the ink.

[Colorant]

Figure 5:
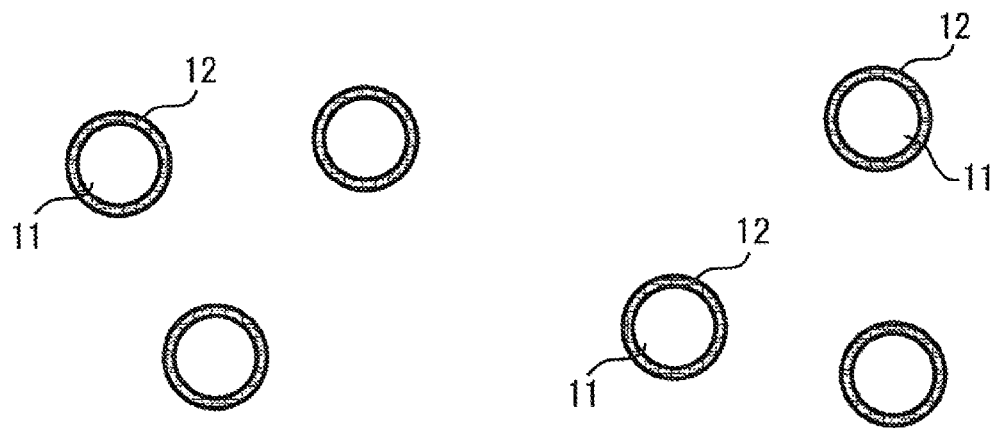
FIG. 5 is a diagram of pigment particles contained in an ink.

Now, the colorant contained in the ink of the present embodiment will be described with reference to mainly FIG. 5.

The colorant contained in the ink of the present embodiment is a pigment dispersion containing a large number of pigment particles. Each particle (colorant particle) constituting the colorant of the ink of the present embodiment contains, as illustrated in FIG. 5, mainly a pigment particle 11 and a resin 12 coating the pigment particle 11. The resin 12 is formed on the surface of the pigment particle 11 (i.e., adsorbed onto the pigment particle 11) so as to inhibit aggregation of the pigment particles 11. It is noted that there also is a portion of the resin 12 not adsorbed onto the pigment particle 11 (namely, an unadsorbed resin portion) in the ink. The resin 12 has an anionic property.

(Pigment)

As a yellow pigment, for example, C.I. pigment yellow (74, 93, 95, 109, 110, 120, 128, 138, 139, 151, 154, 155, 173, 180, 185, or 193) is preferably used. As an orange pigment, for example, C.I. pigment orange (34, 36, 43, 61, 63, or 71) is preferably used. As a red pigment, for example, C.I. pigment red (122 or 202) is preferably used. As a blue pigment, for example, C.I. pigment blue (15) is preferably used. As a violet pigment, for example, C.I. pigment violet (19, 23, or 33) is preferably used. As a black pigment, for example, C.I. pigment black (7) is preferably used.

The content of the colorant in the ink is preferably 4% by mass or more and 8% by mass or less based on the total mass of the ink. If the content of the colorant in the ink is 4% by mass or more, an image with a desired image density can be easily formed by using the ink. On the other hand, if the content of the colorant in the ink is 8% by mass or less, a flow property of the ink can be secured, and hence, an image with a desired image density can be easily formed by using the ink. Besides, since the permeability of the ink to a recording sheet can be secured, offset can be easily inhibited.

In order to improve the color density, the hue or the stability of the ink, the colorant has a volume median diameter ($D_{50}$) of preferably 30 nm or more and 200 nm or less, and more preferably 70 nm or more and 130 nm or less.

(Resin)

As the resin 12, for example, a styrene-acrylic-based resin containing a unit derived from styrene, and a unit derived from acrylic acid, methacrylic acid, acrylic ester or methacrylic ester is preferably used. Specifically, the resin 12 is preferably, for example, a styrene-acrylic acid-acrylic acid alkyl ester copolymer, a styrene-methacrylic acid-methacrylic acid alkyl ester-acrylic acid alkyl ester copolymer, a styrene-acrylic acid copolymer, a styrene-maleic acid copolymer, a styrene-maleic acid-acrylic acid alkyl ester copolymer, a styrene-methacrylic acid copolymer, a styrene-methacrylic acid alkyl ester copolymer, a styrene-melic acid half ester copolymer, a vinyl naphthalene-acrylic acid copolymer, or a vinyl naphthalene-melic acid copolymer.

The mass average molecular weight (Mw) of the resin 12 is preferably 10000 or more and 160000 or less. The mass average molecular weight (Mw) can be measured by gel filtration chromatography. The molecular weight of the resin 12 can be adjusted by changing polymerization conditions for the resin 12 (such as an amount of a polymerization initiator to be used, a polymerization temperature, and a polymerization time). The amount of a radical polymerization initiator to be used is preferably 0.001 mol or more and 5 mol or less, and more preferably 0.01 mol or more and 2 mol or less per mol of a monomer mixture. The polymerization temperature is preferably 60° C.±10° C. The polymerization time is preferably 10 hours or more and 24 hours or less.

The acid value of the resin 12 is preferably 150 mgKOH/g or more and 300 mgKOH/g or less. It is presumed that if the acid value of the resin 12 is 150 mgKOH/g or more, the dispersibility of the pigment is so improved that the pigment can be easily micronized. On the other hand, it is presumed that if the acid value of the resin 12 is 300 mgKOH/g or less, the storage stability of the ink is improved. Besides, in order to improve the printing quality, the pigment particle 11 is preferably coated with the resin 12 having a molecular weight of several ten thousand.

The acid value of the resin 12 can be adjusted by changing the amount of a monomer to be used in synthesizing the resin 12. For synthesizing the resin 12, a monomer (such as acrylic acid or methacrylic acid) having an acidic functional group (such as a carboxyl group) is used. The acid value of the resin 12 can be increased by increasing the amount of the monomer having an acidic functional group to be used.

The amount of the resin 12 used in the pigment dispersion is preferably 15 parts by mass or more and 100 parts by mass or less based on 100 parts by mass of the pigment.

In the whole resin 12 contained in the ink, a ratio of a portion of the resin 12 adsorbed onto the pigment particle 11

(namely, an adsorbed resin portion) is preferably 95% by mass or more and less than 100% by mass. If the ratio of the adsorbed resin portion is 95% by mass or more, mist contamination can be inhibited.

[Dispersant]

The dispersant improves the dispersion stability of mainly the pigment particles in the ink. The dispersant contained in the ink of the present embodiment is constituted by a water-soluble nonionic acrylic resin having a hydrophobic segment or a prepolymer thereof. Hereinafter, the term "nonionic acrylic resin" refers to both a nonionic acrylic resin and a prepolymer of the nonionic acrylic resin.

The nonionic acrylic resin has a large effect of inhibiting the mist contamination. Now, this effect will be described with reference to mainly FIGS. 6 and 7.

Figure 6:
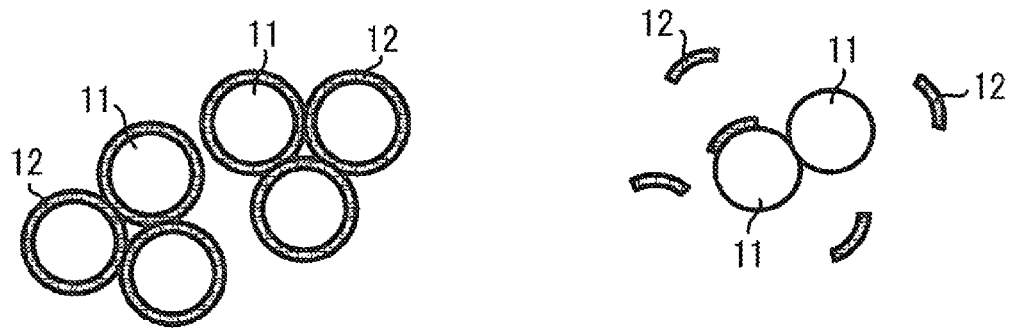
FIG. 6 is a diagram illustrating an example of a state of pigment particles in an ink not containing a water-soluble nonionic acrylic resin.

In an ink containing neither a nonionic acrylic resin nor a prepolymer thereof, since the resin 12 has an anionic property, the solubility of the resin 12 is lowered if the water content is reduced, and therefore, as illustrated in FIG. 6, the resin 12 is liable to be peeled off and the pigment particles 11 are liable to aggregate.

Figure 7:
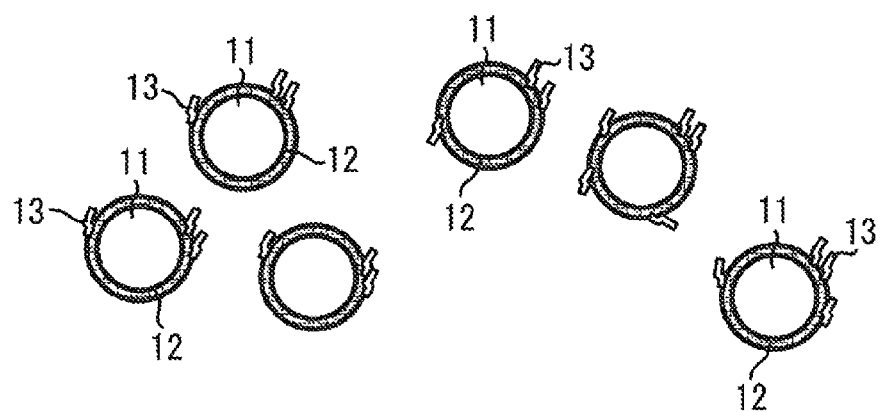
FIG. 7 is a diagram illustrating an example of a state of pigment particles in an ink containing a water-soluble nonionic acrylic resin.

On the other hand, if the nonionic acrylic resin 13 is added to the ink as a dispersant (a sub resin), the nonionic acrylic resin 13 adheres to the surface of the resin 12 as illustrated in FIG. 7, and thus, the solubility of the resin 12 having an anionic property can be improved. Accordingly, even if the water content is reduced, high dispersibility of the pigment particles 11 can be easily retained. When the dispersion stability (re-solubility) of the ink is improved, a portion of the ink adhering to (dried on) the nozzle surface of the head in ejecting the ink can be dissolved in an undried portion of the ink so as to be easily removed, and therefore, the mist contamination is inhibited. The effect of inhibiting the mist contamination is particularly remarkable when a prepolymer (an oligomer in particular) of the nonionic acrylic resin is added to the ink.

If the ink contains the nonionic acrylic resin, the mass average molecular weight of the nonionic acrylic resin is preferably 3000 or more and 8000 or less. If the mass average molecular weight (Mw) of the nonionic acrylic resin is 3000 or more, an image with a desired image density can be easily formed by using the ink. Besides, if the mass average molecular weight (Mw) of the nonionic acrylic resin is 8000 or less, the offset can be inhibited in forming an image by using the ink.

Furthermore, if the ink contains the nonionic acrylic resin, a solution obtained by dissolving 0.1 part by mass of the nonionic acrylic resin in 100 parts by mass of water at 20° C. has a surface tension of preferably 29 mN/m or more and 33 mN/m or less. If the nonionic acrylic resin provides water with a surface tension of 29 mN/m or more, an image with a desired image density can be easily formed by using the ink. Besides, if the nonionic acrylic resin provides water with a surface tension of 33 mN/m or less, the mist contamination can be inhibited in forming an image by using the ink.

As the nonionic acrylic resin, an acrylic resin obtained by polymerization of a hydrophilic segment and a hydrophobic segment, or a prepolymer thereof is preferably used. Preferable examples of the hydrophilic segment include polyethylene glycol acrylate (PEGA), methyl methacrylate (MMA), methyl acrylate (MA), ethyl acrylate (EA), and ethyl methacrylate (EMA). Preferable examples of the hydrophobic segment include stearyl acrylate (SA), benzyl acrylate, and benzyl methacrylate. The surface tension can be adjusted by changing, for example, the type, the mixing ratio, or the molecular weight (the mass average molecular weight) of the hydrophilic segment or the hydrophobic segment.

It is noted that another dispersant (surfactant) may be used together with the nonionic acrylic resin.

The content of the nonionic acrylic resin is preferably 0.05% by mass or more and 0.5% by mass or less based on the total mass of the ink. If the content of the nonionic acrylic resin in the ink is 0.05% by mass or more, the offset can be inhibited in forming an image by using the ink. Besides, if the content of the nonionic acrylic resin in the ink is 0.5% by mass or less, an image with a desired image density can be easily formed by using the ink.

[Penetrant]

The penetrant is used for purpose of improving the permeability of the ink to, for example, a recording sheet.

The ink of the present embodiment contains two types of penetrants (i.e., a first penetrant and a second penetrant). The first penetrant is a polyhydric alcohol monobutyl (namely, n-, sec-, iso-, or tert-butyl) ether. The second penetrant is a polyhydric alcohol monoethyl ether or a polyhydric alcohol monopropyl (namely, n- or iso-propyl) ether.

The polyhydric alcohol monobutyl ether has a property to improve the permeability (wettability) of the ink to a recording sheet. Therefore, if the ink contains the polyhydric alcohol monobutyl ether, the offset can be inhibited in forming an image by using the ink.

The polyhydric alcohol monobutyl ether has, however, tendency to lower the dispersion stability (the re-solubility) of the ink after concentration. It is presumed that the dispersion stability (the re-solubility) of the ink is lowered because the resin of the pigment dispersion swells due to high hydrophobicity of the polyhydric alcohol monobutyl ether.

When the re-solubility of the ink is lowered, the mist contamination is easily caused in forming an image by using the ink. On the other hand, if the re-solubility of the ink can be improved, an ink adhering to (dried on) the nozzle surface of the head in ejecting the ink is dissolved in an undried ink so as to be removed, and hence, good mist adhesion resistance can be attained even if a moisture retaining material with a high boiling point is used.

Therefore, in the present embodiment, the polyhydric alcohol monobutyl ether (the first penetrant) is used together with the polyhydric alcohol monoethyl ether or the polyhydric alcohol monopropyl ether (the second penetrant). The effect of the polyhydric alcohol monoethyl ether or the polyhydric alcohol monopropyl ether of improving the permeability is smaller than that of the polyhydric alcohol monobutyl ether. However, by further adding the polyhydric alcohol monoethyl ether or the polyhydric alcohol monopropyl ether, the dispersion stability (the re-solubility) of the ink can be largely improved. As a result, the mist contamination can be inhibited in forming an image by using the ink.

Since the ink of the present embodiment contains both the polyhydric alcohol monobutyl ether, and the polyhydric alcohol monoethyl ether or the polyhydric alcohol monopropyl ether, both the mist contamination and the offset can be inhibited in forming an image by using the ink of the present embodiment. Besides, a high quality image can be formed by using a line head.

The content of the polyhydric alcohol monobutyl ether in the ink is preferably 2.0% by mass or more and 4.5% by mass or less, and the content of the polyhydric alcohol monoethyl ether or the polyhydric alcohol monopropyl ether in the ink is preferably 3.0% by mass or more and 6.0% by mass or less. If the content of the polyhydric alcohol monobutyl ether in the ink is 2.0% by mass or more, the offset can be inhibited in forming an image by using the ink. If the content of the polyhydric alcohol monobutyl ether in the ink is 4.5% by mass or less, the mist contamination can be inhibited in forming an image by using the ink. Besides, if the content of the polyhydric alcohol monoethyl ether or the polyhydric alcohol monopropyl ether in the ink is 3.0% by mass or more, the mist contamination can be inhibited in forming an image by using the ink. If the content of the polyhydric alcohol monoethyl ether or the polyhydric alcohol monopropyl ether in the ink is 6.0% by mass or less, the mist contamination can be inhibited in forming an image by using the ink.

It is preferable that the content of the polyhydric alcohol monobutyl ether in the ink is 2.0% by mass or more and is equal to or less than 1.5 times as much as the content of the polyhydric alcohol monoethyl ether or the polyhydric alcohol monopropyl ether in the ink, and it is preferable that the content of the polyhydric alcohol monoethyl ether or the polyhydric alcohol monopropyl ether in the ink is 3.0% by mass or more and is equal to or less than 2.0 times as much as the content of the polyhydric alcohol monobutyl ether in the ink. If the content of the polyhydric alcohol monobutyl ether in the ink is equal to or less than 1.5 times as much as the content of the polyhydric alcohol monoethyl ether or the polyhydric alcohol monopropyl ether in the ink, the mist contamination can be inhibited in forming an image by using the ink. If the content of the polyhydric monoethyl ether or the polyhydric alcohol monopropyl ether in the ink is equal to or less than 2.0 times as much as the content of the polyhydric alcohol monobutyl ether in the ink, the mist contamination can be inhibited in forming an image by using the ink.

As the polyhydric alcohol monoethyl ether, diethylene glycol monoethyl ether is particularly preferred. The polyhydric alcohol monoethyl ether is, however, not limited to this but may be, for example, ethylene glycol monoethyl ether or triethylene glycol monoethyl ether.

As the polyhydric alcohol monopropyl ether, diethylene glycol monoisopropyl ether or diethylene glycol mononormalpropyl ether is particularly preferred. The polyhydric alcohol monopropyl ether is, however, not limited to this, but may be, for example, ethylene glycol monoisopropyl ether or triethylene glycol monoisopropyl ether.

As the polyhydric alcohol monobutyl ether, triethylene glycol monobutyl ether is preferred, and triethylene glycol mononormalbutyl ether is more preferred. The polyhydric alcohol monobutyl ether is, however, not limited to this, but may be, for example, ethylene glycol monobutyl ether, diethylene glycol monobutyl ether, or propylene glycol monobutyl ether.

Examples

Now, examples of the present disclosure will be described. It is noted that the present disclosure is not limited to the following examples.

[Evaluation 1]

In Evaluation 1, samples (inks) respectively containing different pigment dispersions were evaluated for the re-solubility, the particle size change rate, the mist adhesion resistance, the offset resistance, and the image density.

<Method for Preparing Samples>

Table 1 below shows the composition of each sample (ink) used in Evaluation 1.

TABLE 1

| Materials of ink | Ratio (mass %) |
| --- | --- |
| Pigment dispersion | 40.0 |
| Triethylene glycol monobutyl ether | 4.5 |
| Diethylene glycol monoethyl ether | 3.0 |
| 2-Pyrrolidone | 5.0 |
| Nonionic acrylic resin | 0.4 |
| 1,2-Octanediol | 0.6 |
| Glycerin | 15.0 |
| 1,3-Propanediol | 15.0 |
| Ion-exchanged water | balance |
| Total | 100.0 |

(Pigment Dispersion)

Table 2 below shows seven types of pigment dispersions (dispersions A1 to A7) used in Evaluation 1. The dispersion A7 is of self-dispersion type, and hence no resin is contained in the dispersion A7. As the dispersion A7, "CAB-O-JET (registered trademark) 450C (PB 15:4)" manufactured by Cabot Corporation was used.

TABLE 2

| Pigment dispersion | | A1 | A2 | A3 | A4 | A5 | A6 | A7 |
| --- | --- | --- | --- | --- | --- | --- | --- | --- |
| Ratio (mass %) | Resin | 6.0 | 6.0 | 7.0 | 7.0 | 6.0 | 6.0 | Self-dispersion type |
| | Pigment | 15.0 | 15.0 | 15.0 | 15.0 | 15.0 | 15.0 | 15.0 |
| | Olfine E1010 | 0.5 | 0.5 | 0.5 | 0.5 | 0.5 | 0.5 | 0.5 |
| | Water | balance | balance | balance | balance | balance | balance | balance |
| Resin | | Resin A | Resin B | Resin C | Resin C | Resin D | Resin E | — |
| Amount of initiator (g) | | 0.40 | 0.25 | 0.30 | 0.30 | 0.23 | 0.21 | — |
| Drop time (hour) | | 2.0 | 3.0 | 2.5 | 2.5 | 3.0 | 3.5 | — |
| Resin/pigment (mass ratio) | | 0.40 | 0.40 | 0.47 | 0.47 | 0.40 | 0.36 | — |
| Amount of resin (g) | | 6 | 6 | 7 | 7 | 6 | 6 | — |
| Amount of unadsorbed resin portion (g) | | 0.18 | 0.10 | 0.22 | 0.29 | 0.32 | 0.37 | — |
| Adsorbed resin ratio (mass %) | | 97.0 | 98.3 | 96.3 | 95.2 | 94.6 | 93.8 | — |

Table 3 below shows resins A to E respectively used in preparing the dispersions A1 to A6. Each of the resins A to E is water-soluble and alkali-soluble.

TABLE 3

| | Resin | | | | |
|---|---|---|---|---|---|
| | Resin A | Resin B | Resin C | Resin D | Resin E |
| Molecular weight | 20000 | 33000 | 25000 | 34000 | 36000 |
| Acid value | 150 | 150 | 150 | 150 | 150 |
| Composition | Styrene/acrylic acid/butyl acrylate/methyl methacrylate | | | | |

Now, a method for synthesizing the resin A will be described. Incidentally, methods for synthesizing the resins B to E are substantially the same as the method for synthesizing the resin A except that part of conditions (such as the amount of an initiator to be used and the drop time; see Table 2) was changed for attaining molecular weights shown in Table 3, and hence, the description of the methods for synthesizing the resins B to E will be omitted.

On a 1000 ml four-neck flask, a stirrer, a nitrogen introducing tube, a condenser (a stirring machine), and a dropping funnel were set. Then, 100 g of isopropyl alcohol and 300 g of methyl ethyl ketone were added to the flask, and the resultant was heated to reflux with a nitrogen gas bubbling.

Besides, 40 g of methyl methacrylate, 40 g of styrene, 10 g of butyl acrylate (BA), 10 g of methacrylic acid, and 0.4 g of azobisisobutyronitrile (AIBN) serving as an initiator were mixed and molten. The resulting molten product was placed in the dropping funnel, and was added dropwise to the flask over 2 hours under reflux by heating at 70° C. After the dropwise addition, the resultant was further heated to reflux for 6 hours.

Subsequently, a methyl ethyl ketone solution of 0.2 g of AIBN was added dropwise to the flask over 15 minutes. After the dropwise addition, the resultant was further heated to reflux for 5 hours. As a result, a styrene-acrylic resin (the resin A) having a mass average molecular weight (Mw) of 20000 was obtained.

The mass average molecular weight (Mw) of the thus obtained styrene-acrylic resin was confirmed by using a gel filtration chromatography apparatus ("HLC-8020GPC" manufactured by Tosoh Corporation), resulting in finding that the resin had the mass average molecular weight (Mw) with a value as shown in Table 3. The method for measuring the mass average molecular weight (Mw) of each resin shown in Table 3 was the same as a measurement method employed in Evaluation 2 (Table 7) described later. Besides, the acid value of the resultant resin confirmed by titration was 150 mgKOH/g.

Next, a method for preparing the dispersion A1 will be described. As shown in Table 2, the resin A was used in preparing the dispersion A1. Incidentally, methods for preparing the dispersions A2 to A6 were substantially the same as that for preparing the dispersion A1 except that the type and the amount of resin to be used were changed as shown in Table 2.

Fifteen (15) parts by mass of a cyan pigment, 6 parts by mass of the resin A, 0.5 part by mass of an ethylene oxide adduct of acetylenediol ("Olfine E1010" manufactured by Nissin Chemical Industry Co., Ltd.), and 78.5 parts by mass of water (ion-exchanged water) were added to a vessel with a capacity of 0.6 L of a media type dispersing machine ("DYNO-MILL" manufactured by Shinmaru Enterprises Corporation). Besides, potassium hydroxide (KOH) in an amount necessary for neutralizing the resin A was further added to the vessel.

As the cyan pigment, phthalocyanine blue 15:3 ("Lionol Blue FG-7330" manufactured by Toyo Ink Co., Ltd.) was used.

The resin A was neutralized by adding a KOH aqueous solution so as to adjust the content of the vessel to pH 8. The mass of K was calculated on the basis of the mass of the resin A. Besides, the mass of the water (ion-exchanged water) was calculated in consideration of both the mass of water contained in the KOH aqueous solution and the mass of water generated by the neutralization.

Subsequently, a medium (that is, zirconia beads with a diameter of 0.5 mm) was filled in the vessel in an amount of 70% by volume based on the capacity of the vessel, and the resultant was kneaded at 10° C. and a peripheral speed of 8 m/sec under cooling with water to attain a volume median diameter ($D_{50}$) of the pigment of 70 nm or more and 130 nm or less. As a result, the pigment dispersion was obtained.

The volume median diameter ($D_{50}$) of the pigment was measured with a dynamic light scattering particle size distribution analyzer ("Zetasizer Nano" manufactured by Sysmex Corporation) by using, as a measurement sample, a solution obtained by diluting the pigment dispersion with ion-exchanged water 300 times.

There is a tendency that a pigment can be easily micronized when beads with a small diameter are used. Besides, there is a tendency that coating of a pigment particle with a resin is enhanced when beads with a small diameter are used. The degree of dispersion of the coated particles, the amount of free resin, the particle size of the pigment, and the like can be varied by changing the diameter of beads to be used in the dispersing machine.

For measuring the amount of an unadsorbed resin portion, 10 g of the pigment dispersion was put in a cell (a vessel) of a centrifuge ("NS-C100") to be centrifuged at a rotational speed of 5000 rpm for 24 hours. Thereafter, it was visually confirmed that the supernatant of the pigment dispersion in the cell was transparent, and the whole amount of supernatant was collected. Subsequently, the collected supernatant was solidified under reduced pressure of 0.67 Pa at 150° C. Thus, a solid principally containing the free resin was obtained. The mass of the thus obtained solid corresponds to the mass of the unadsorbed resin portion (including a portion of the resin in an ion state and a portion of the resin coupled to a counter ion). The "amount of unadsorbed resin portion" listed in Table 2 shows the mass of the free resin (the unadsorbed resin portion) in 100 g of the pigment dispersion. Besides, an adsorbed resin ratio (a ratio of adsorbed resin portion) was calculated in accordance with the following formula 1:

Adsorbed resin ratio=100×(1−amount of unadsorbed resin portion/total resin amount)[% by mass]   Formula 1:

Incidentally, the "amount of resin" listed in Table 2 shows the total amount of resin contained in 100 g of the pigment dispersion, and the "adsorbed resin ratio" listed in Table 2 is obtained in accordance with formula 1.

The amount of unadsorbed resin portion can be controlled on the basis of the number of passes in the dispersing machine, the diameter of the beads, and the ejection amount. Table 4 below shows amounts of unadsorbed resin portions in pigment dispersions respectively obtained under different dispersion conditions (conditions 1 to 4).

TABLE 4

| | | Dispersion conditions | | | |
|---|---|---|---|---|---|
| | | Condition 1 | Condition 2 | Condition 3 | Condition 4 |
| First pass | Bead diameter | 1.0 mm | 0.5 mm | 1.0 mm | 1.0 mm |
| | Ejection amount | 300 g/min | 300 g/min | 300 g/min | 300 g/min |
| Second pass | Bead diameter | — | — | 1.0 mm | 0.5 mm |
| | Ejection amount | — | — | 200 g/min | 300 g/min |
| Resin/pigment (mass ratio) | | 0.3 | 0.3 | 0.3 | 0.3 |
| Amount of unadsorbed resin portion (g) | | 0.18 | 0.09 | 0.54 | 0.03 |

As shown in Table 4, when beads with a small diameter were used, the amount of unadsorbed resin portion could be reduced. In particular, when beads with a small diameter were used in the second pass, the amount of unadsorbed resin portion was reduced. As is understood from Table 4, the amount of adsorbed resin portion (and the adsorbed resin ratio in the end) can be adjusted by changing the dispersion condition. Besides, the amount of unadsorbed resin portion can be reduced also by exchanging a supernatant by the centrifugation with ion-exchanged water.

(Nonionic Acrylic Resin)

Now, a method for synthesizing the nonionic acrylic resin of Table 1 will be described.

On a 1000 ml four-neck flask, a stirrer, a nitrogen introducing tube, a condenser (a stirring machine), and a dropping funnel were set. Then, 100 parts by mass of isopropyl alcohol and 300 parts by mass of methyl ethyl ketone were added to the flask, and the resultant was heated to reflux with a nitrogen gas bubbling.

Besides, 60 parts by mass of polyethylene glycol acrylate (PEGA), 15 parts by mass of butyl acrylate (BA), 15 parts by mass of lauryl acrylate (LA), 10 parts by mass of methyl methacrylate (MMA), and 0.4 part by mass of azobisisobutyronitrile (AIBN) serving as an initiator were mixed and molten. The resulting molten product was placed in the dropping funnel, and was added dropwise to the flask over 2 hours under reflux by heating at 70° C. After the dropwise addition, the resultant was further heated to reflux for 6 hours.

Subsequently, a methyl ethyl ketone solution of 0.2 part by mass of AIBN was added dropwise to the flask over 15 minutes. After the dropwise addition, the resultant was further heated to reflux for 5 hours. As a result, the nonionic acrylic resin was obtained. The thus obtained nonionic acrylic resin was water-soluble. The surface tension measured with 0.1 part by mass of the nonionic acrylic resin added to 100 parts by mass of water was 30.6 mN/m. The molecular weight of the nonionic acrylic resin was 4000.

(Preparation of Ink)

Now, a method for preparing each ink used in Evaluation 1 will be described.

Forty (40) parts by mass of the corresponding pigment dispersion, 4.5 parts by mass of triethylene glycol mononormalbutyl ether (corresponding to a first penetrant), 3.0 parts by mass of diethylene glycol monoethyl ether (corresponding to a second penetrant), 5.0 parts by mass of 2-pyrrolidone (corresponding to a solubility stabilizer), 0.4 part by mass of the water-soluble nonionic acrylic resin (corresponding to a dispersant), 0.6 part by mass of 1,2-octanediol (corresponding to a high penetrating agent), 15 parts by mass of glycerin (corresponding to a humectant), 15 parts by mass of 1,3-propanediol (corresponding to a humectant), and 16.5 parts by mass of ion-exchanged water were homogeneously mixed by stirring with a stirring machine ("Three-one motor BL-600" manufactured by As One Corporation) at a rotational speed of 400 rpm. Subsequently, the resultant mixture was filtrated by using a filter having a hole diameter of 5 μm for removing foreign matters and coarse particles. As a result, the ink was obtained.

<Evaluation Method>

Now, evaluation methods for the re-solubility, the particle size change rate, the mist adhesion resistance, the offset resistance, and the image density employed in Evaluation 1 will be successively described.

(Re-Solubility and Particle Size Change Rate)

Five (5) g of the ink (sample) was put in a petri dish (450 mm), and the resultant petri dish holding the ink was placed in an incubator (drier). Subsequently, the ink was dried in the incubator until the water content of the ink was lost. Specifically, the ink was allowed to stand still for 3 days in the incubator set at 60° C. Then, a mass W1 of the ink remaining in the petri dish and a volume median diameter ($D_{50}$) R1 of the pigment particles attained after the drying were measured. Incidentally, the volume median diameter ($D_{50}$) was measured by using a dynamic light scattering particle size distribution analyzer ("Zetasizer Nano" manufactured by Sysmex Corporation).

Subsequently, 5 g of undried ink (namely, fresh ink) was added to the petri dish after the drying, and the petri dish was allowed to stand still on a horizontal table for 30 minutes. Thereafter, the petri dish was inclined so as to have an angle of 135° between the bottom of the petri dish and the top surface of the table, so as to allow the ink to drop off from the petri dish. Then, a mass W2 of the ink remaining in the petri dish after the dropping was measured.

On the basis of the thus measured masses W1 and W2, the re-solubility of the ink was calculated in accordance with the following formula 2:

Re-solubility=100×(1−(W2−W0)/W1)[% by mass]   Formula 2:

In formula 2, "W0" represents an average mass of the ink that remains to adhere to the petri dish after adding 5 g of undried ink to the petri dish and allowing the ink to drop until no droplets dripped (namely, a wetted weight of the ink to the petri dish). In this measurement, the mass W0 was 0.3 g. If the re-solubility was 90% by mass or more, the ink was evaluated as "G (good)", and if the re-solubility was less than 90% by mass, it was evaluated as "P (poor)".

Furthermore, on the basis of the volume median diameter ($D_{50}$) R1 of the pigment particles measured after the drying as described above, the particle size change rate of the ink was calculated in accordance with the following formula 3:

Particle size change rate=100×R1/R0[% by mass]    Formula 3:

In formula 3, "R0" represents a volume median diameter ($D_{50}$) of the pigment contained in undried ink (fresh ink). If the particle size change rate was 105% by mass or less, the ink was evaluated as "G (good)", and if the particle size change rate was larger than 105% by mass, it was evaluated as "P (poor)".

(Mist Adhesion Resistance)

The printer 100 having the structure as illustrated in FIG. 1 was used, the ink (sample) was filled in the head (the line head 20d) disposed in the position closest to the exit device 103 (the exit roller), and a blowing fan was used for blowing air against the nozzles 30a (see FIGS. 3A and 3B) of the line head 20d at a blowing speed of 1 m/sec. Thereafter, 3 pL of droplets per nozzle was ejected 10000 times for allowing a mist to adhere to the nozzle surface. Subsequently, the mist was dried by blowing air against the nozzles 30a having the mist adhering thereto for 1 hour. Then, after 0.5 cc of the ink was purged (discharged) through the nozzles 30a, the nozzle surface was cleaned with a wipe, and it was determined whether or not the mist having adhered to the nozzle surface could be removed. Such purging and cleaning with a wipe was repeated, and if the mist could be removed by performing the purging and cleaning once, the ink was evaluated as "G (good)", and if the mist could not be removed, it was evaluated as "P (poor)".

(Offset Resistance)

The printer 100 having the structure as illustrated in FIG. 1 was used, the ink (sample) was filled in the head (the line head 20d) disposed in the position closest to the exit device 103 (the exit roller), and excess ink having been projected through the nozzle surface was scraped off by using a wiping blade. Besides, A4-size paper P ("IJW" manufactured by Oji Paper Co., Ltd.) was set in the paper feed cassette 101. A distance between the nozzle surface of the line head 20d and the paper P was fixed to 1 mm, and the conveyance speed for the paper P from the paper feed cassette 101 to the exit device 103 was set to 846.7 mm/sec.

Under environment of 10° C. and 80% RH, the ink was ejected from the line head 20d so as to attain an ink ejection amount onto the paper P of 15 g/m$^2$, and thus, ten solid images of 10 cm×10 cm were continuously formed. Then, the paper P on which the tenth solid image was formed was subjected to evaluation for contamination in a portion (an offset portion) brought into contact with the roller 103b (the driven roller) having a surface made of PTFE (polytetrafluoroethylene).

For the evaluation of the contamination, an image scanner ("GT-X820" manufactured by Seiko Epson Corporation) was used. More specifically, the offset portion of the tenth paper P was read by the image scanner, and a pixel exceeding a threshold of 220 was determined as a black pixel (contamination). Then, on the basis of the number of black pixels, an offset area ratio was calculated in accordance with the following formula 4:

Offset area ratio=100×number of black pixels/total number of pixels[%]    Formula 4:

Incidentally, it is presumed that as the offset area ratio is higher, the degree of contamination of the recording paper due to offset is higher. If the offset area ratio exceeds 0.03%, the contamination of the recording paper due to offset can be visually recognized in many cases. Therefore, if the offset area ratio was 0.03% or less, the ink was evaluated as "G (good)", and if the offset area ratio was higher than 0.03%, it was evaluated as "P (poor)".

(Image Density)

The printer 100 having the structure as illustrated in FIG. 1 was used, the ink (sample) was filled in the head (the line head 20d) disposed in the position closest to the exit device 103 (the exit roller), and a solid image of 10 cm×10 cm was formed on A4-size plain paper ("C$^2$" manufactured by Fuji Xerox Co., Ltd.). The amount of ink ejected from the line head 20d was controlled to be 11 pL per droplet of the ink, and images were formed under the same conditions for the respective inks.

Each paper on which the image had been formed was allowed to stand still for a whole day and night under environment of room temperature and normal humidity (25° C. and 60% RH), and then, the image density of the image formed on the paper was measured by using a portable reflection densitometer ("RD-19" manufactured by Sakata Inx Eng. Co., Ltd.). An average of the image densities measured in ten positions in the image was obtained as an evaluation value. If the evaluation value (the average of the image densities) was 1.10 or more, the ink was evaluated as "G (good)", and if the evaluation value was less than 1.10, it was evaluated as "P (poor)".

<Samples and Evaluation Results>

Table 5 shows inks A1 to A7 evaluated in Evaluation 1. In Evaluation 1, the inks A1 to A7 were prepared by the aforementioned method, and the thus prepared inks A1 to A7 were evaluated. In the inks A1 to A6, the dispersions A1 to A6 shown in Table 2 were respectively used as the pigment dispersion. Besides, in the ink A7 the self-dispersion type pigment dispersion was used.

TABLE 5

| Ink | Ink A1 | Ink A2 | Ink A3 | Ink A4 | Ink A5 | Ink A6 | Ink A7 |
| --- | --- | --- | --- | --- | --- | --- | --- |
| Pigment dispersion | Dispersion A1 | Dispersion A2 | Dispersion A3 | Dispersion A4 | Dispersion A5 | Dispersion A6 | Self-dispersion type |
| Re-solubility (mass %) | 93 | 95 | 91 | 92 | 80 | 74 | 96 |
| Particle size change rate (mass %) | 101 | 101 | 103 | 105 | 108 | 112 | 143 |
| Mist adhesion resistance | G | G | G | G | P | P | P |
| Offset resistance (%) | 0.024 | 0.021 | 0.020 | 0.022 | 0.018 | 0.036 | 0.078 |
| Image density | 1.12 | 1.14 | 1.13 | 1.12 | 1.12 | 1.15 | 1.10 |

Now, the evaluation results of the respective samples obtained in Evaluation 1 will be described.

(Re-Solubility)

The inks A1 to A4 and A7 had a re-solubility of 90% by mass or more. The ink A5 and A6 had a re-solubility less than 90% by mass.

(Particle Size Change Rate)

The inks A1 to A4 had a particle size change rate of 105% by mass or less. The inks A5 to A7 had a particle size change rate higher than 105% by mass.

(Mist Adhesion Resistance)

The inks A1 to A4 were evaluated as "G (good)" in the mist adhesion resistance. On the other hand, the inks A5 to A7 were evaluated as "P (poor)" in the mist adhesion resistance.

(Offset Resistance)

The inks A1 to A5 had offset resistance of 0.03% or less. The inks A6 and A7 had offset resistance higher than 0.03%.

(Image Density)

All the inks A1 to A7 showed an image density of 1.1 or more.

As shown in Tables 2 and 5, each of the inks A1 to A4 contains the colorant having an absorbed resin ratio (i.e., a ratio of the adsorbed resin portion) of 95% by mass or more and less than 100% by mass. It is presumed that if the adsorbed resin ratio is 95% by mass or more, a high re-solubility can be secured, and hence good mist adhesion resistance can be attained.

[Evaluation 2]

Now, Evaluation 2 will be described. In Evaluation 2, samples (inks) respectively containing dispersants having different compositions were evaluated for the re-solubility, the particle size change rate, the mist adhesion resistance, the offset resistance, and the image density.

<Samples and Evaluation Results>

Table 6 below shows the composition of each sample (ink) used in Evaluation 2.

TABLE 6

| Materials of ink | Ratio (mass %) |
| --- | --- |
| Pigment dispersion (Dispersion A2) | 40.0 |
| Triethylene glycol monobutyl ether | 4.5 |
| Diethylene glycol monoethyl ether | 3.0 |
| 2-Pyrrolidone | 5.0 |
| Dispersant | 0.4 |
| 1,2-Octanediol | 0.6 |
| Glycerin | 15.0 |
| 1,3-Propanediol | 15.0 |
| Ion-exchanged water | balance |
| Total | 100.0 |

Table 7 below shows the dispersants (specifically, a resin PA, a resin PB, a resin PC, a resin PD, a resin PE, and a resin 680) respectively used in the samples (inks) of Evaluation 2.

TABLE 7

| Dispersant | Composition (mass %) | Surface tension (mN/m) | Molecular weight (Mw) |
| --- | --- | --- | --- |
| Resin PA | PEGA/BA/MMA = 50/20/30 | 41.0 | 3000 |
| Resin PB | PEGA/BA/LA/MMA = 50/10/7/33 | 33.6 | 5000 |
| Resin PC | PEGA/BA/LA/MMA = 60/20/15/5 | 30.4 | 4000 |
| Resin PD | PEGA/BA/PPGA/LA/MMA = 60/10/10/12/8 | 30.5 | 5000 |
| Resin PE | PEGA/LA/MMA = 60/30/10 | Insoluble in water | 4000 |
| Resin 680 (Joncryl 680) | Anionic styrene acrylic resin | 53.0 | 4900 |

Incidentally, in Table 7, "PEGA" stands for polyethylene glycol acrylate, "BA" stands for butyl acrylate, "MMA" stands for methyl methacrylate, "LA" stands for lauryl acrylate, and "PPGA" stands for polypropylene glycol acrylate. Besides, the "resin 680" listed in Table 7 is a commercially available anionic styrene acrylic resin ("Joncryl 680" manufactured by BASF Japan Ltd.).

The surface tension of each resin listed in Table 7 was a surface tension of a solution (at a temperature of 20° C.) obtained by dissolving 0.1 part by mass of the resin in 100 parts by mass of water. The resin PE did not dissolve in water. It is noted that the surface tension of water (at a temperature of 20° C.) is 72.75 mN/m.

The mass average molecular weight (Mw) of each resin listed in Table 7 was measured by using the gel filtration chromatography apparatus ("HLC-8020GPC" manufactured by Tosoh Corporation) under the following conditions:

<Measurement Conditions for Mass Average Molecular Weight>

Column: "TSK gel Super Multipore HZ-H" (semi-micro column of 4.6 mm I.D.×15 cm) manufactured by Tosoh Corporation The number of columns: three Eluent: tetrahydrofuran Flow rate: 0.35 mL/min Sample injection amount: 10 μL Measurement temperature: 40° C.

Detector: IR detector

Incidentally, a calibration curve was prepared by using eight types, that is, F-40, F-20, F-4, F-1, A-5000, A-2500, A-1000, and n-propylbenzene, selected from TSK gel standard polystyrenes manufactured by Tosoh Corporation.

Table 8 below shows inks B1 to B7 evaluated in Evaluation 2.

TABLE 8

| Ink | Ink B1 | Ink B2 | Ink B3 | Ink B4 | Ink B5 | Ink B6 | Ink B7 |
| --- | --- | --- | --- | --- | --- | --- | --- |
| Dispersant | none | Resin PA | Resin PB | Resin PC | Resin PD | Resin PE | Resin 680 |
| Surface tension (0.1% addition) | — | 41.0 | 33.6 | 30.4 | 30.5 | insoluble | 53.0 |
| Re-solubility (mass %) | 54 | 86 | 92 | 95 | 94 | 76 | 76 |
| Particle size change rate (mass %) | 123 | 112 | 109 | 101 | 103 | 102 | 110 |
| Mist adhesion resistance | P | P | P | G | G | P | P |

TABLE 8-continued

| Ink | Ink B1 | Ink B2 | Ink B3 | Ink B4 | Ink B5 | Ink B6 | Ink B7 |
|---|---|---|---|---|---|---|---|
| Offset resistance (%) | 0.086 | 0.054 | 0.033 | 0.026 | 0.022 | 0.021 | 0.045 |
| Image density | 1.01 | 1.02 | 1.11 | 1.14 | 1.13 | 1.12 | 1.06 |

As shown in Table 8, the ink B1 used no dispersant. Besides, the inks B2, B3, B4, B5, B6 and B7 respectively use, as the dispersant, the resin PA, the resin PB, the resin PC, the resin PD, the resin PE, and the resin 680 listed in Table 7. Incidentally, a method for preparing each of the inks B1 to B7 used in Evaluation 2 was the same as the method for preparing each sample of Evaluation 1 except that the dispersant was changed.

Now, the evaluation results of the samples obtained in Evaluation 2 will be described.

(Re-Solubility)

The inks B3 to B5 had a re-solubility of 90% by mass or more. The inks B1, B2, B6, and B7 had a re-solubility less than 90% by mass.

(Particle Size Change Rate)

The inks B4 to B6 had a particle size change rate of 105% by mass or less. The inks B1 to B3 and B7 had a particle size change rate higher than 105% by mass.

(Mist Adhesion Resistance)

The inks B4 and B5 were evaluated as "G (good)" in the mist adhesion resistance. On the other hand, the inks B1 to B3, B6, and B7 were evaluated as "P (poor)" in the mist adhesion resistance.

(Offset Resistance)

The inks B4 to B6 had offset resistance of 0.03% or less. The inks B1 to B3 and B7 had offset resistance higher than 0.03%.

(Image Density)

The inks B3 to B6 showed an image density of 1.1 or more. The inks B1, B2 and B7 showed an image density lower than 1.1.

As shown in Tables 7 and 8, each of the inks B4 and B5 contains the dispersant that shows a surface tension of 29 mN/m or more and 33 mN/m or less in the form of a solution obtained by dissolving 0.1 part by mass of the dispersant in 100 parts by mass of water at 20° C. It is presumed that if the dispersant provides water with a surface tension of 29 mN/m or more, a sufficient hydrophilic property can be secured, and hence an image with a desired image density (of, for example, 1.1 or more) can be formed. Besides, it is presumed that if the dispersant provides water with a surface tension of 33 mN/m or less, a sufficient hydrophobic property can be secured, and hence good mist adhesion resistance (continuous ejection property) can be attained.

As shown in Tables 7 and 8, each of the inks B4 and B5 contains the dispersant having a mass average molecular weight (Mw) of 3000 or more and 8000 or less. It is presumed that if the dispersant has a mass average molecular weight (Mw) of 3000 or more, the permeability is not too high, and hence an image with a desired image density (of, for example, 1.1 or more) can be formed. Besides, it is presumed that if the dispersant has a mass average molecular weight (Mw) of 8000 or less, sufficient permeability can be secured, and hence good offset resistance (of, for example, 0.03% or less) can be attained.

The resin PC contained in the ink B4 and the resin PD contained in the ink B5 are nonionic acrylic resins containing polyethylene glycol acrylate (PEGA), butyl acrylate (BA), lauryl acrylate (LA), and methyl methacrylate (MMA) as shown in Table 7, and the content of the methyl methacrylate in each of these resins is 5% by mass or more and 30% by mass or less. When the aforementioned composition is employed for a dispersant, a dispersant having a mass average molecular weight (Mw) of 3000 or more and 8000 or less and showing a surface tension of 29 mN/m or more and 33 mN/m or less can be easily obtained.

[Evaluation 3]

Now, Evaluation 3 will be described. In Evaluation 3, samples (inks) respectively using dispersants showing different surface tensions or having different molecular weights were evaluated for the re-solubility, the particle size change rate, the mist adhesion resistance, the offset resistance, and the image density. Incidentally, the samples (inks) used in Evaluation 3 have the composition shown in Table 6 similarly to the samples of Evaluation 2.

<Samples and Evaluation Results>

Table 9 below shows dispersants (specifically, a resin PD-st, a resin PD-1, a resin PD-2, a resin PD-3, a resin PD-4, and a resin PD-5) respectively contained in the samples (inks) used in Evaluation 3. The surface tension of each resin listed in Table 9 is a surface tension of a solution (at a temperature of 20° C.) obtained by dissolving 0.1 part by mass of the resin in 100 parts by mass of water. The mass average molecular weight (Mw) of each resin listed in Table 9 was measured by the same method as that employed in Evaluation 2 (Table 7).

TABLE 9

| Dispersant | Composition (mass %) | Surface tension (mN/m) | Molecular weight (Mw) |
|---|---|---|---|
| Resin PD-st | PEGA/BA/PPGA/LA/MMA = 60/10/10/12/8 | 30.5 | 5000 |
| Resin PD-1 | | 32.6 | 2500 |
| Resin PD-2 | | 32.1 | 3000 |
| Resin PD-3 | | 30.7 | 5000 |
| Resin PD-4 | | 29.1 | 8000 |
| Resin PD-5 | | 28.5 | 9000 |

Table 10 below shows inks C1 to C6 evaluated in Evaluation 3.

TABLE 10

| | Ink C1 | Ink C2 | Ink C3 | Ink C4 | Ink C5 | Ink C6 |
|---|---|---|---|---|---|---|
| Dispersant | Resin PD-st | Resin PD-1 | Resin PD-2 | Resin PD-3 | Resin PD-4 | Resin PD-5 |
| Surface tension (0.1% addition) | 30.5 | 32.6 | 32.1 | 30.7 | 29.1 | 28.5 |
| Re-solubility (mass %) | 94 | 96 | 95 | 94 | 92 | 93 |
| Particle size change rate (mass %) | 103 | 102 | 101 | 105 | 101 | 100 |
| Mist adhesion resistance | G | G | G | G | G | G |

TABLE 10-continued

|  | Ink | | | | | |
| --- | --- | --- | --- | --- | --- | --- |
|  | Ink C1 | Ink C2 | Ink C3 | Ink C4 | Ink C5 | Ink C6 |
| Offset resistance (%) | 0.022 | 0.026 | 0.025 | 0.023 | 0.026 | 0.034 |
| Image density | 1.13 | 1.06 | 1.13 | 1.14 | 1.12 | 1.10 |

As shown in Table 10, the inks C1, C2, C3, C4, C5, and C6 respectively used, as the dispersant, the resin PD-st, the resin PD-1, the resin PD-2, the resin PD-3, the resin PD-4, and the resin PD-5 listed in Table 9. Incidentally, a method for preparing each of the inks C1 to C6 used in Evaluation 3 was the same as the method for preparing each sample of Evaluation 1 except that the dispersant was changed.

Now, evaluation results of the respective samples used in Evaluation 3 will be described.

(Re-Solubility)

All the inks C1 to C6 had a re-solubility of 90% by mass or more.

(Particle Size Change Rate)

All the inks C1 to C6 had a particle size change rate of 105% by mass or less.

(Mist Adhesion Resistance)

All the inks C1 to C6 were evaluated as "G (good)" in the mist adhesion resistance.

(Offset Resistance)

The inks C1 to C5 had offset resistance of 0.03% or less. The ink C6 had offset resistance higher than 0.03%.

(Image Density)

The inks C1 and C3 to C6 showed an image density of 1.1 or more. The ink C2 showed an image density lower than 1.1.

As shown in Tables 9 and 10, each of the inks C1 and C3 to C5 contained the dispersant having a mass average molecular weight (Mw) of 3000 or more and 8000 or less. It is presumed that if the dispersant has a mass average molecular weight (Mw) of 3000 or more, the permeability is not too high, and hence an image with a desired image density (of, for example, 1.1 or more) can be formed. Besides, it is presumed that if the dispersant has a mass average molecular weight (Mw) of 8000 or less, sufficient permeability can be secured, and hence good offset resistance (of, for example, 0.03% or less) can be attained.

As shown in Tables 9 and 10, each of the inks C1 and C3 to C5 contains the dispersant that shows a surface tension of 29 mN/m or more and 33 mN/m or less in the form of a solution obtained by dissolving 0.1 part by mass of the dispersant in 100 parts by mass of water at 20° C. It is presumed that if the dispersant provides water with a surface tension of 29 mN/m or more, a sufficient hydrophilic property can be secured, and hence an image with a desired image density (of, for example, 1.1 or more) can be formed. Besides, it is presumed that if the dispersant provides water with a surface tension of 33 mN/m or less, a sufficient hydrophobic property can be secured, and hence good mist adhesion resistance (continuous ejection property) can be attained.

The resins PD-st, PD-2, PD-3, and PD-4 respectively contained in the inks C1, C3, C4, and C5 are nonionic acrylic resins containing polyethylene glycol acrylate (PEGA), butyl acrylate (BA), lauryl acrylate (LA), and methyl methacrylate (MMA) as shown in Table 9, and the content of methyl methacrylate in each of these resins is 5% by mass or more and 30% by mass or less. When the aforementioned composition is employed for a dispersant, a dispersant having a mass average molecular weight (Mw) of 3000 or more and 8000 or less and showing a surface tension of 29 mN/m or more and 33 mN/m or less can be easily obtained.

[Evaluation 4]

Now, Evaluation 4 will be described. In Evaluation 4, samples (inks) different in the content of a dispersant were evaluated for the re-solubility, the particle size change rate, the mist adhesion resistance, the offset resistance, and the image density.

<Samples and Evaluation Results>

Table 11 below shows inks D1 to D5 evaluated in Evaluation 4.

TABLE 11

|  |  | Ink | | | | |
| --- | --- | --- | --- | --- | --- | --- |
|  |  | Ink D1 | Ink D2 | Ink D3 | Ink D4 | Ink D5 |
| Dispersant | Material | Resin PC | Resin PC | Resin PC | Resin PC | Resin PC |
|  | Ratio (mass %) | 0.03 | 0.05 | 0.30 | 0.50 | 0.60 |
| Re-solubility (mass %) | | 93 | 95 | 95 | 93 | 92 |
| Particle size change rate (mass %) | | 103 | 102 | 101 | 102 | 103 |
| Mist adhesion resistance | | G | G | G | G | G |
| Offset resistance (%) | | 0.045 | 0.025 | 0.024 | 0.022 | 0.021 |
| Image density | | 1.13 | 1.12 | 1.14 | 1.12 | 1.08 |

Each of the samples (inks) used in Evaluation 4 had the composition as shown in Table 6 similarly to each sample of Evaluation 2. However, as shown in Table 11, in the inks D1, D2, D3, D4, and D5 used in Evaluation 4, the contents of the dispersant were respectively 0.03% by mass, 0.05% by mass, 0.3% by mass, 0.5% by mass, and 0.6% by mass. Besides, the inks D1 to D5 used the resin PC shown in Table 7 as the dispersant. Incidentally, a method for preparing each of the inks D1 to D5 used in Evaluation 4 was the same as that employed for each sample of Evaluation 1 except that the content of the dispersant was changed.

Now, evaluation results of the respective samples used in Evaluation 4 will be described.

(Re-Solubility)

All the inks D1 to D5 had a re-solubility of 90% by mass or more.

(Particle Size Change Rate)

All the inks D1 to D5 had a particle size change rate lower than 105% by mass.

(Mist Adhesion Resistance)

All the inks D1 to D5 were evaluated as "G (good)" in the mist adhesion resistance.

(Offset Resistance)

The inks D2 to D5 had offset resistance of 0.03% or less. The ink D1 had offset resistance higher than 0.03%.

(Image Density)

The inks D1 to D4 showed an image density of 1.1 or more. The ink D5 showed an image density lower than 1.1.

As shown in Table 11, each of the inks D2 to D4 contains the dispersant in a ratio of 0.05% by mass or more and 0.5% by mass or less based on the total mass of the ink. It is presumed that if the content of the dispersant is 0.05% by mass or more, sufficient permeability can be secured, and hence good offset resistance (of, for example, 0.03% or less) can be attained. Besides, it is presumed that if the content of the dispersant is 0.5% by mass or less, the permeability is not too high, and hence an image with a desired image density (of, for example, 1.1 or more) can be formed.

[Evaluation 5]

Now, Evaluation 5 will be described. In Evaluation 5, samples (inks) each using, as a dispersant, a general nonionic surfactant were evaluated for the re-solubility, the particle size change rate, the mist adhesion resistance, the offset resistance, and the image density.

<Samples and Evaluation Results>

Table 12 below shows inks E1 and E2 evaluated in Evaluation 5. For comparison, the evaluation results of the ink B4 (see Tables 7 and 8) are also shown together with evaluation results of the inks E1 and E2 in Table 12.

TABLE 12

|  |  | Ink |  |  |
| --- | --- | --- | --- | --- |
|  |  | Ink B4 | Ink E1 | Ink E2 |
| Dispersant | Material | Resin PC | Surfynol 440 | Epan 720 |
|  | Molecular weight (Mw) | 4000 | 570 | 2300 |
| Re-solubility (mass %) |  | 95 | 23 | 53 |
| Particle size change rate (mass %) |  | 101 | 120 | 116 |
| Mist adhesion resistance |  | G | P | P |
| Offset resistance |  | 0.026 | 0.028 | 0.033 |
| Image density |  | 1.14 | 1.12 | 1.10 |

As shown in Table 12, the ink E1 used, as the dispersant, "Surfynol 440" manufactured by Nissin Chemical Co., Ltd. having a molecular weight (Mw) of 570. Besides, the ink E2 used, as the dispersant, "Epan 720" manufactured by Daiichi Kogyo Seiyaku Co., Ltd. having a molecular weight (Mw) of 2300. Incidentally, a method for preparing each of the inks E1 and E2 used in Evaluation 5 was the same as that employed for each sample of Evaluation 1 except that the dispersant was changed.

Now, evaluation results of the samples obtained in Evaluation 5 will be described.

(Re-Solubility)

Both the inks E1 and E2 had a re-solubility less than 90% by mass.

(Particle Size Change Rate)

Both the inks E1 and E2 had a particle size change rate of 105% by mass or more.

(Mist Adhesion Resistance)

Both the inks E1 and E2 were evaluated as "P (poor)" in the mist adhesion resistance.

(Offset Resistance)

The ink E1 had offset resistance of 0.03% or less. The ink E2 had offset resistance higher than 0.03%.

(Image Density)

Both the inks E1 and E2 showed an image density of 1.1 or more.

As shown in Table 12, the inks E1 and E2 respectively using the commercially available dispersants "Surfynol 440" and "Epan 720" had low re-solubility, and good mist adhesion resistance could not be attained. Besides, in using "Surfynol 440" having a low molecular weight (Mw), sufficient dispersion stability could not be attained.

[Evaluation 6]

Now, Evaluation 6 will be described. In Evaluation 6, samples (inks) containing a penetrant in different contents were evaluated for the re-solubility, the particle size change rate, the mist adhesion resistance, the offset resistance, and the image density.

<Samples and Evaluation Results>

Table 13 below shows the composition of each sample (ink) used in Evaluation 6.

TABLE 13

| Materials of ink | Ratio (mass %) |
| --- | --- |
| Pigment dispersion (Dispersion A2) | 40.0 |
| First penetrant (BTG) | 0.0-5.0 |
| Second penetrant | 0.0-6.5 |
| 2-Pyrrolidone | 5.0 |
| Nonionic acrylic resin (Resin PC) | 0.4 |
| 1,2-Octanediol | 0.6 |
| Glycerin | 30.0 |
| Ion-exchanged water | balance |
| Total | 100.0 |

Tables 14 and 15 below show evaluation results of inks F1 to F8 and G1 to G6 obtained in Evaluation 6.

TABLE 14

|  |  | Ink |  |  |  |  |  |  |  |
| --- | --- | --- | --- | --- | --- | --- | --- | --- | --- |
|  |  | Ink F1 | Ink F2 | Ink F3 | Ink F4 | Ink F5 | Ink F6 | Ink F7 | Ink F8 |
| Penetrant (mass %) | BTG | 0.0 | 1.5 | 2.0 | 3.0 | 4.0 | 4.5 | 5.0 | 4.5 |
|  | EDG | 3.0 | 3.0 | 3.0 | 3.0 | 3.0 | 3.0 | 3.0 | 6.0 |
| Re-solubility (mass %) |  | 99 | 97 | 96 | 94 | 93 | 95 | 88 | 91 |
| Particle size change rate (mass %) |  | 102 | 101 | 102 | 101 | 101 | 101 | 104 | 104 |
| Mist adhesion resistance |  | G | G | G | G | G | G | P | G |
| Offset resistance (%) |  | 0.065 | 0.034 | 0.028 | 0.026 | 0.026 | 0.026 | 0.025 | 0.022 |
| Image density |  | 1.04 | 1.12 | 1.13 | 1.14 | 1.14 | 1.12 | 1.08 | 1.10 |

TABLE 15

| Ink | | Ink G1 | Ink G2 | Ink G3 | Ink G4 | Ink G5 | Ink G6 |
|---|---|---|---|---|---|---|---|
| Penetrant | BTG | 3.0 | 3.0 | 3.0 | 3.0 | 3.0 | 3.0 |
| (mass %) | EDG | 0.0 | 2.0 | 3.0 | 5.0 | 6.0 | 6.5 |
| Re-solubility (mass %) | | 86 | 90 | 94 | 93 | 91 | 91 |
| Particle size change rate (mass %) | | 113 | 107 | 101 | 102 | 104 | 114 |
| Mist adhesion resistance | | P | P | G | G | G | P |
| Offset resistance (%) | | 0.030 | 0.028 | 0.026 | 0.026 | 0.025 | 0.026 |
| Image density | | 1.12 | 1.10 | 1.14 | 1.11 | 1.12 | 1.08 |

As shown in Table 14 or 15, each of the inks F2 to F8 and G2 to G6 used triethylene glycol mononormalbutyl ether (BTG) as the first penetrant, and diethylene glycol monoethyl ether (EDG) as the second penetrant. In the inks F2, F3, F4, F5, F6, and F7, the content of the second penetrant (EDG) was the same (specifically, 3.0% by mass) but the contents of the first penetrant (BTG) were respectively 1.5% by mass, 2.0% by mass, 3.0% by mass, 4.0% by mass, 4.5% by mass, and 5.0% by mass. In the ink F1, merely EDG was used in a content of 3.0% by mass. In the ink F8, the content of the first penetrant (BTG) was 4.5% by mass and the content of the second penetrant (EDG) was 6.0% by mass. In the inks G2, G3, G4, G5, and G6, the content of the first penetrant (BTG) was the same (specifically, 3.0% by mass) but the contents of the second penetrant (EDG) were respectively 2.0% by mass, 3.0% by mass, 5.0% by mass, 6.0% by mass, and 6.5% by mass. In the ink G1, merely BTG was used in a content of 3.0% by mass.

Incidentally, a method for preparing each of the inks F1 to F8 and G1 to G6 used in Evaluation 6 was the same as that for preparing each sample of Evaluation 1 except that the penetrant and its content were changed.

Now, evaluation results of the samples used in Evaluation 6 will be described.

(Re-Solubility)

The inks F1 to F6 and F8 had a re-solubility of 90% by mass or more. The ink F7 had a re-solubility less than 90% by mass.

The inks G2 to G6 had a re-solubility of 90% by mass or more. The ink G1 had a re-solubility less than 90% by mass.

(Particle Size Change Rate)

All the inks F1 to F8 had a particle size change rate of 105% by mass or less.

The inks G3 to G5 had a particle size change rate of 105% by mass or less. The inks G1, G2, and G6 had a particle size change rate higher than 105% by mass.

(Mist Adhesion Resistance)

The inks F1 to F6 and F8 were evaluated as "G (good)" in the mist adhesion resistance. On the other hand, the ink F7 was evaluated as "P (poor)" in the mist adhesion resistance.

The inks G3 to G5 were evaluated as "G (good)" in the mist adhesion resistance. On the other hand, the inks G1, G2, and G6 were evaluated as "P (poor)" in the mist adhesion resistance.

(Offset Resistance)

The inks F3 to F8 had offset resistance of 0.03% or less. The inks F1 and F2 had offset resistance higher than 0.03%.

All the inks G1 to G6 had offset resistance of 0.03% or less.

(Image Density)

The inks F2 to F6 and F8 showed an image density of 1.1 or more. The inks F1 and F7 showed an image density lower than 1.1.

The inks G1 to G5 showed an image density of 1.1 or more. The ink G6 showed an image density lower than 1.1.

As shown in Tables 14 and 15, in each of the inks F3 to F6, F8, and G3 to G5, the content of BTG is 2.0% by mass or more and 4.5% by mass or less, and the content of EDG is 3.0% by mass or more and 6.0% by mass or less. It is presumed that if the content of BTG is 2.0% by mass or more, sufficient permeability (wettability) can be secured, and hence good offset resistance (of, for example, 0.03% or less) can be attained. Besides, it is presumed that if the content of BTG is 4.5% by mass or less and the content of EDG is 3.0% by mass or more and 6.0% by mass or less, sufficient dispersion stability (re-solubility) can be secured, and hence good mist adhesion resistance can be attained, and an image with a desired image density (of, for example, 1.1 or more) can be formed.

Furthermore, as shown in Tables 14 and 15, in each of the inks F3 to F6, F8, and G3 to G5, the content of BTG is 2.0% by mass or more and is equal to or less than 1.5 times as much as the content of EDG, and the content of EDG is 3.0% by mass or more and is equal to or less than 2.0 times as much as the content of BTG. It is presumed that if the content of BTG is equal to or less than 1.5 times as much as the content of EDG, and the content of EDG is 2.0% by mass or more and is equal to or less than 2.0 times as much as the content of BTG, sufficient dispersion stability (re-solubility) can be secured, and hence good mist adhesion resistance can be attained.

Incidentally, as shown in Tables 14 and 15, a ratio (mass ratio) of the content of BTG to the content of EDG is 0.67 in the ink F3, 1.0 in the ink F4, 1.33 in the ink F5, 1.5 in the ink F6, 0.75 in the ink F8, 1.0 in the ink G3, 0.6 in the ink G4, and 0.5 in the ink G5. Besides, a ratio (mass ratio) of the content of EDG to the content of BTG is 1.5 in the ink F3, 1.0 in the ink F4, 0.75 in the ink F5, 0.67 in the ink F6, 1.33 in the ink F8, 1.0 in the ink G3, 1.67 in the ink G4, and 2.0 in the ink G5.

[Evaluation 7]

Now, Evaluation 7 will be described. In Evaluation 7, samples (inks) containing a penetrant in different contents were evaluated for the re-solubility, the particle size change rate, the mist adhesion resistance, the offset resistance, and the image density.

<Samples and Evaluation Results>

Each of the samples (inks) used in Evaluation 7 had the composition shown in Table 13 similarly to each sample of Evaluation 6. In each sample (ink) of Evaluation 7, diethylene glycol monoisopropyl ether (IPDG) was used as the second penetrant.

Table 16 below shows inks H1 to H4 evaluated in Evaluation 7.

TABLE 16

| | | Ink | | | |
|---|---|---|---|---|---|
| | | Ink H1 | Ink H2 | Ink H3 | Ink H4 |
| Penetrant (mass %) | BTG | 3.0 | 3.0 | 3.0 | 3.0 |
| | IPDG | 2.5 | 3.0 | 6.0 | 6.5 |
| Re-solubility (mass %) | | 91 | 94 | 93 | 88 |
| Particle size change rate (mass %) | | 107 | 102 | 104 | 108 |
| Mist adhesion resistance | | P | G | G | P |
| Offset resistance (%) | | 0.028 | 0.025 | 0.024 | 0.023 |
| Image density | | 1.13 | 1.10 | 1.11 | 1.12 |

As shown in Table 16, in each of the inks H1 to H4, triethylene glycol mononormalbutyl ether (BTG) was used as the first penetrant, and diethylene glycol monoisopropyl ether (IPDG) was used as the second penetrant. In the inks H1, H2, H3, and H4, the content of the first penetrant (BTG) was the same (specifically, 3.0% by mass) but the contents of the second penetrant (IPDG) were respectively 2.5% by mass, 3.0% by mass, 6.0% by mass, and 6.5% by mass.

Incidentally, a method for preparing each of the inks H1 to H4 used in Evaluation 7 was the same as that for preparing each sample of Evaluation 1 except that the penetrant was changed.

Now, evaluation results of the samples used in Evaluation 7 will be described.

(Re-Solubility)

The inks H1 to H3 had a re-solubility of 90% by mass or more. The ink H4 had a re-solubility less than 90% by mass.

(Particle Size Change Rate)

The inks H2 and H3 had a particle size change rate of 105% by mass or less. The inks H1 and H4 had a particle size change rate higher than 105% by mass.

(Mist Adhesion Resistance)

The inks H2 and H3 were evaluated as "G (good)" in the mist adhesion resistance. On the other hand, the inks H1 and H4 were evaluated as "P (poor)" in the mist adhesion resistance.

(Offset Resistance)

All the inks H1 to H4 had offset resistance of 0.03% or less.

(Image Density)

All the inks H1 to H4 showed an image density of 1.1 or more.

As shown in Table 16, in each of the inks H2 and H3, the content of BTG was 2.0% by mass or more and 4.5% by mass or less, and the content of IPDG was 3.0% by mass or more and 6.0% by mass or less. It is presumed that if the content of BTG is 2.0% by mass or more, sufficient permeability (wettability) can be secured, and hence good offset resistance (of, for example, 0.03% or less) can be attained. Besides, it is presumed that if the content of BTG is 4.5% by mass or less and the content of IPDG is 3.0% by mass or more and 6.0% by mass or less, sufficient dispersion stability (re-solubility) can be secured, and hence good mist adhesion resistance can be attained, and an image with a desired image density (of, for example, 1.1 or more) can be formed.

Furthermore, as shown in Table 16, in each of the inks H2 and H3, the content of BTG was 2.0% by mass or more and was equal to or less than 1.5 times as much as the content of IPDG, and the content of IPDG was 3.0% by mass or more and was equal to or less than 2.0 times as much as the content of BTG. It is presumed that if the content of BTG is equal to or less than 1.5 times as much as the content of IPDG, and the content of IPDG is 3.0% by mass or more and is equal to or less than 2.0 times as much as the content of BTG, good mist adhesion resistance can be attained, and an image with a desired image density (of, for example, 1.1 or more) can be formed.

Incidentally, as shown in Table 16, a ratio (mass ratio) of the content of BTG to the content of IPDG is 1.0 in the ink H2, and 0.5 in the ink H3. Besides, a ratio (mass ratio) of the content of IPDG to the content of BTG is 1.0 in the ink H2, and 2.0 in the ink H3.

[Evaluation 8]

Now, Evaluation 8 will be described. In Evaluation 8, samples (inks) containing a penetrant in different contents were evaluated for the re-solubility, the particle size change rate, the mist adhesion resistance, the offset resistance, and the image density.

<Samples and Evaluation Results>

Each of the samples (inks) used in Evaluation 8 had the composition shown in Table 13 similarly to each sample of Evaluation 6. In each sample (ink) of Evaluation 8, however, diethylene glycol mononormalpropyl ether (PDG) was used as the second penetrant.

Table 17 below shows inks I1 to I4 evaluated in Evaluation 8.

TABLE 17

| | | Ink | | | |
|---|---|---|---|---|---|
| | | Ink I1 | Ink I2 | Ink I3 | Ink I4 |
| Penetrant (mass %) | BTG | 3.0 | 3.0 | 3.0 | 3.0 |
| | PDG | 2.5 | 3.0 | 6.0 | 6.5 |
| Re-solubility (mass %) | | 92 | 94 | 95 | 85 |
| Particle size change rate (mass %) | | 107 | 101 | 103 | 112 |
| Mist adhesion resistance | | P | G | G | P |
| Offset resistance (%) | | 0.030 | 0.026 | 0.028 | 0.025 |
| Image density | | 1.12 | 1.11 | 1.12 | 1.13 |

As shown in Table 17, in each of the inks I1 to I4, triethylene glycol mononormalbutyl ether (BTG) was used as the first penetrant, and diethylene glycol mononormalpropyl ether (PDG) was used as the second penetrant. In the inks I1, I2, I3, and I4, the content of the first penetrant (BTG) was the same (specifically, 3.0% by mass) but the contents of the second penetrant (PDG) were respectively 2.5% by mass, 3.0% by mass, 6.0% by mass, and 6.5% by mass.

Incidentally, a method for preparing each of the inks I1 to I4 used in Evaluation 8 was the same as that for preparing each sample of Evaluation 1 except that the penetrant was changed.

Now, evaluation results of the samples used in Evaluation 8 will be described.

(Re-Solubility)

The inks I1 to I3 had a re-solubility of 90% by mass or more. The ink I4 had a re-solubility less than 90% by mass.

(Particle Size Change Rate)

The inks I2 and I3 had a particle size change rate of 105% by mass or less. The inks I1 and I4 had a particle size change rate higher than 105% by mass.

(Mist Adhesion Resistance)

The inks I2 and I3 were evaluated as "G (good)" in the mist adhesion resistance. On the other hand, the inks I1 and I4 were evaluated as "P (poor)" in the mist adhesion resistance.

(Offset Resistance)

All the inks I1 to I4 had offset resistance of 0.03% or less.

(Image Density)

All the inks I1 to I4 showed an image density of 1.1 or more.

As shown in Table 17, in each of the inks I2 and I3, the content of BTG was 2.0% by mass or more and 4.5% by mass or less, and the content of PDG was 3.0% by mass or more and 6.0% by mass or less. It is presumed that if the content of BTG is 2.0% by mass or more, sufficient permeability (wettability) can be secured, and hence good offset resistance (of, for example, 0.03% or less) can be attained. Besides, it is presumed that if the content of BTG is 4.5% by mass or less and the content of PDG is 3.0% by mass or more and 6.0% by mass or less, sufficient dispersion stability (re-solubility) can be secured, and hence good mist adhesion resistance can be attained, and an image with a desired image density (of, for example, 1.1 or more) can be formed.

Furthermore, as shown in Table 17, in each of the inks I2 and I3, the content of BTG was 2.0% by mass or more and was equal to or less than 1.5 times as much as the content of PDG, and the content of PDG was 3.0% by mass or more and was equal to or less than 2.0 times as much as the content of BTG. It is presumed that if the content of BTG is equal to or less than 1.5 times as much as the content of PDG, and the content of PDG is 3.0% by mass or more and is equal to or less than 2.0 times as much as the content of BTG, good mist adhesion resistance can be attained, and an image with a desired image density (of, for example, 1.1 or more) can be formed.

Incidentally, as shown in Table 17, a ratio (mass ratio) of the content of BTG to the content of PDG was 1.0 in the ink I2, and 0.5 in the ink I3. Besides, a ratio (mass ratio) of the content of PDG to the content of BTG was 1.0 in the ink I2, and 2.0 in the ink I3.

[Evaluation 9]

Now, Evaluation 9 will be described. In Evaluation 9, samples (inks) containing a penetrant in different contents were evaluated for the re-solubility, the particle size change rate, the mist adhesion resistance, the offset resistance, and the image density.

<Samples and Evaluation Results>

Each of the samples (inks) used in Evaluation 9 had the composition shown in Table 13 similarly to each sample of Evaluation 6. In each sample (ink) of Evaluation 9, however, diethylene glycol monomethyl ether (MDG) was used as the second penetrant.

Table 18 below shows inks J1 to J3 evaluated in Evaluation 9.

TABLE 18

|  |  | Ink | | |
| --- | --- | --- | --- | --- |
|  |  | Ink J1 | Ink J2 | Ink J3 |
| Penetrant | BTG | 3.0 | 3.0 | 3.0 |
| (mass %) | MDG | 2.0 | 4.5 | 6.0 |
| Re-solubility (mass %) |  | 84 | 82 | 76 |
| Particle size change rate (mass %) |  | 109 | 111 | 114 |
| Mist adhesion resistance |  | P | P | P |
| Offset resistance (%) |  | 0.028 | 0.025 | 0.024 |
| Image density |  | 1.08 | 1.10 | 1.11 |

As shown in Table 18, in each of the inks J1 to J3, triethylene glycol mononormalbutyl ether (BTG) was used as the first penetrant, and diethylene glycol monomethyl ether (MDG) was used as the second penetrant. In the inks J1, J2, and J3, the content of the first penetrant (BTG) was the same (specifically, 3.0% by mass) but the contents of the second penetrant (MDG) were respectively 2.0% by mass, 4.5% by mass, and 6.0% by mass.

Incidentally, a method for preparing each of the inks J1 to J3 used in Evaluation 9 was the same as that for preparing each sample of Evaluation 1 except that the penetrant was changed.

Now, evaluation results of the samples used in Evaluation 9 will be described.

(Re-Solubility)

All the inks J1 to J3 had a re-solubility less than 90%.

(Particle Size Change Rate)

All the inks J1 to J3 had a particle size change rate higher than 105% by mass.

(Mist Adhesion Resistance)

All the inks J1 to J3 were evaluated as "P (poor)" in the mist adhesion resistance.

(Offset Resistance)

All the inks J1 to J3 had offset resistance of 0.03% or less.

(Image Density)

The inks J2 and J3 showed an image density of 1.1 or more. The ink J1 showed an image density lower than 1.1

As shown in Table 18, all the inks J1 to J3 using MDG as the second penetrant were poor in the re-solubility and the dispersion stability, and good mist adhesion resistance could not be attained.

The present disclosure is not limited to the aforementioned embodiment and examples. The present disclosure can be practiced with, for example, the following modifications made.

The details of the constitution (including a component, a size, a material, and a shape) of the ink can be arbitrarily modified or omitted within the scope of the gist of the present disclosure.

The inkjet head is not limited to the line head but is arbitrary. The inkjet head may be, for example, a serial head. A serial head is an inkjet head employing a method in which an ink is ejected while the head is reciprocating (shuttling) in a direction perpendicular to a paper conveyance direction.

The ink of the present disclosure may be used in an apparatus other than the printer. The ink of the present disclosure may be used in, for example, a multifunction peripheral (multifunctional image forming apparatus). A multifunction peripheral has functions of, for example, a scanner, a copying machine, a printer, and a facsimile. Alternatively, the ink of the present disclosure may be used for a purpose (such as data recording) other than image formation.

The embodiment, examples and modifications described above may be arbitrarily combined. As long as the inkjet recording ink contains at least a polyhydric alcohol monoethyl ether or a polyhydric alcohol monopropyl ether, and a polyhydric alcohol monobutyl ether, both the mist contamination and the offset can be inhibited, or a high quality image can be formed by using a line head.

What is claimed is:

1. An inkjet recording ink, comprising a polyhydric alcohol monoethyl ether or a polyhydric alcohol monopropyl ether, a polyhydric alcohol monobutyl ether, a pigment particle coated with an anionic resin, and a nonionic acrylic resin or a prepolymer of the acrylic resin having a hydrophobic segment.

2. An inkjet recording ink according to claim 1,
wherein the polyhydric alcohol monoethyl ether is diethylene glycol monoethyl ether, the polyhydric alcohol monopropyl ether is diethylene glycol monopropyl ether, and the polyhydric alcohol monobutyl ether is triethylene glycol monobutyl ether.

3. An inkjet recording ink according to claim 1, wherein a content of the polyhydric alcohol monobutyl ether is 2.0% by mass or more and 4.5% by mass or less, and a content of the polyhydric alcohol monoethyl ether or the polyhydric alcohol monopropyl ether is 3.0% by mass or more and 6.0% by mass or less.

4. An inkjet recording ink according to claim 1, wherein a content of the polyhydric alcohol monobutyl ether is 2.0% by mass or more and is equal to or less than 1.5 times as much as a content of the polyhydric alcohol monoethyl ether or the polyhydric alcohol monopropyl ether, and the content of the polyhydric alcohol monoethyl ether or the polyhydric alcohol monopropyl ether is 3.0% by mass or more and is equal to or less than 2.0 times as much as the content of the polyhydric alcohol monobutyl ether.

5. An inkjet recording ink according to claim 1, wherein the acrylic resin or the prepolymer of the acrylic resin is water soluble, the acrylic resin or the prepolymer of the acrylic resin has a mass average molecular weight of 3000 or more and 8000 or less, and a solution obtained by dissolving 0.1 part by mass of the acrylic resin or the prepolymer of the acrylic resin in 100 parts by mass of water at 20° C. shows a surface tension of 29 mN/m or more and 33 mN/m or less.

6. An inkjet recording ink according to claim 1, wherein the acrylic resin or the prepolymer of the acrylic resin contains polyethylene glycol acrylate, butyl acrylate, lauryl acrylate, and methyl methacrylate, and a content of the methyl methacrylate in the acrylic resin or the prepolymer of the acrylic resin is 5% by mass or more and 30% by mass or less.

7. An inkjet recording ink according to claim 1, wherein a content of the acrylic resin or the prepolymer of the acrylic resin is 0.05% by mass or more and 0.5% by mass or less.

8. A method for producing an inkjet recording ink, comprising:

forming a pigment dispersion by kneading a pigment, an anionic resin and water;

mixing the pigment dispersion with a water-soluble nonionic acrylic resin or a prepolymer thereof, triethylene glycol monobutyl ether, diethylene glycol monoethyl ether or diethylene glycol monopropyl ether, and water; and filtering a mixture resulting from the mixing.

* * * * *